US012326333B2

(12) United States Patent
Aldahir et al.

(10) Patent No.: US 12,326,333 B2
(45) Date of Patent: Jun. 10, 2025

(54) SYSTEM AND METHOD FOR TESTING A SURFACE

(71) Applicant: Columbia Insurance Company, Omaha, NE (US)

(72) Inventors: Philipe C. F. Aldahir, Chattanooga, TN (US); Jeremy Dutton, Calhoun, GA (US); Austin Bruce Cole, Cohutta, GA (US); Steven Sutton, Dalton, GA (US); Trevor Sands, Kennesaw, GA (US)

(73) Assignee: Columbia Insurance Company, Omaha, NE (US)

( * ) Notice: Subject to any disclaimer, the term of this patent is extended or adjusted under 35 U.S.C. 154(b) by 24 days.

(21) Appl. No.: 18/220,553

(22) Filed: Jul. 11, 2023

(65) Prior Publication Data

US 2023/0384080 A1 Nov. 30, 2023

Related U.S. Application Data

(63) Continuation of application No. 17/020,609, filed on Sep. 14, 2020, now Pat. No. 11,747,128.

(60) Provisional application No. 62/899,572, filed on Sep. 12, 2019, provisional application No. 62/970,068, filed on Feb. 4, 2020.

(51) Int. Cl.
*G01B 5/28* (2006.01)
*A63B 71/02* (2006.01)
*H04N 5/76* (2006.01)

(52) U.S. Cl.
CPC .............. *G01B 5/28* (2013.01); *A63B 71/02* (2013.01); *A63B 2220/05* (2013.01); *A63B 2220/78* (2013.01); *A63B 2220/806* (2013.01); *A63B 2220/807* (2013.01); *H04N 5/76* (2013.01)

(58) Field of Classification Search
CPC ......... G01B 5/28; G01B 11/002; A63B 71/02; A63B 2220/05; A63B 2220/78; A63B 2220/806; A63B 2220/807; H04N 5/76; H04N 5/77; G01N 2203/0276; G01N 2203/0647; G01N 3/30; G01N 3/068
See application file for complete search history.

(56) References Cited

U.S. PATENT DOCUMENTS

| | | | |
|---|---|---|---|
| 6,505,498 B2 | 1/2003 | Pringle | |
| 6,755,072 B1 * | 6/2004 | Kanemitsu | A63B 60/42 73/11.01 |
| 6,837,094 B2 | 1/2005 | Pringle et al. | |
| 6,990,845 B2 * | 1/2006 | Voon | G01N 3/48 73/12.14 |

(Continued)

FOREIGN PATENT DOCUMENTS

| | | |
|---|---|---|
| GB | 320049 A | 9/1929 |
| KR | 101295788 B1 | 8/2013 |

OTHER PUBLICATIONS https://digitalcommons.calpoly.edu/cgi/viewcontent.cgi?article=1382&context=mesp (Year: 2016).*

(Continued)

*Primary Examiner* — Jeffrey S Vanderveen
(74) *Attorney, Agent, or Firm* — Ballard Spahr LLP

(57) ABSTRACT

Systems and methods for testing a surface are described. An apparatus can be configured to consistently strike a ball to maintain consistent testing conditions. One or more parameters may be determined based on a path of travel of the ball.

20 Claims, 23 Drawing Sheets

(56) References Cited

U.S. PATENT DOCUMENTS

| | | |
|---|---|---|
| 8,974,314 B2 | 3/2015 | Basile |
| 2013/0331195 A1 | 12/2013 | Sery |
| 2016/0144261 A1 | 5/2016 | Basile |

OTHER PUBLICATIONS

Extended European Search Report and Opinion for EP Application No. 20862889.1 mailed Sep. 12, 2023 (18 pages).
Cogswell et al., "Golf Putter Testing Mechanism", Dec. 12, 2016, pp. 1-96.
Wilson et al., "Kicking, Snapping and Throwing the Ball in Intercollegiate Robotic Football", ME Department Ohio Ada OH,. pp. 1-10.Univerisity.
European Office Action for EP Application No. 20862899.1 mailed Jun. 5, 2024 (9 pages).

\* cited by examiner

SYSTEM AND METHOD FOR TESTING A SURFACE

CROSS-REFERENCE TO RELATED APPLICATIONS

This application claims priority under 35 U.S.C. § 120 to, and is a continuation of, U.S. patent application Ser. No. 17/020,609, filed Sep. 14, 2020, which claims the benefit of U.S. Provisional Patent Application No. 62/899,572, filed Sep. 12, 2019, and U.S. Provisional Patent Application No. 62/970,068 filed Feb. 4, 2020, the entire contents of each of which are hereby incorporated herein by reference in their entireties for all purposes.

BACKGROUND

Determining how a field plays is a complex, multifaceted endeavor. Surface properties, as well as player/surface and ball/surface interactions ultimately define how a field "plays." Sports turf playability is also determined by the type of sport played on the turf. Fields for baseball, football, soccer, lacrosse, golf, polo, tennis, and field hockey to mention a few, all have different playability expectations and parameters, to accommodate for the game. In the case of baseball, one of the defining playability factors is the baseball bounce and pace. Players qualify a field as "true" if the bounce is consistent and acceptable. They also qualify a field as "fast" or "slow", based on the ball speed before and after a bounce. These are game-affecting metrics, as players adjust their style of play to fit a certain type of field. There is a need for systems and methods for assessing surface playability.

SUMMARY

It is to be understood that both the following general description and the following detailed description are exemplary and explanatory only and are not restrictive. Provided are methods and systems for testing a surface.

It is to be understood that both the following general description and the following detailed description are exemplary and explanatory only and are not restrictive. Methods, systems, and apparatuses are disclosed for receiving video data, the video data comprising video of an object contacting a surface, determining, based on the video data, one or more characteristics associated with the object, and determining, based on the one or more characteristics of the object, one or more characteristics of the contact between the object and the surface.

An apparatus can comprise a frame comprising a plurality of rail sections. A first rail section of the plurality of rail sections comprises one or more cavities configured to receive a rod that extends through the first rail section. The apparatus can also comprise a rotatable member coupled to a second rail section of the plurality of rail sections and a third rail section of the plurality of rail sections. The rotatable member can be configured to couple a ball striking device to the frame such that the ball striking device is free to rotate around the rotatable member in a single direction. The rod that extends through the first rail section can be configured to keep the ball striking device from moving around the rotatable member at a fixed height based on which of the one or more cavities the rod extends through.

A method can comprise striking a ball with a ball striking apparatus. The apparatus can comprise a frame comprising a plurality of rail sections. A first rail section of the plurality of rail sections comprises one or more cavities configured to receive a rod that extends through the first rail section. The apparatus can also comprise a rotatable member coupled to a second rail section of the plurality of rail sections and a third rail section of the plurality of rail sections. The rotatable member can be configured to couple a ball striking device to the frame such that the ball striking device is free to rotate around the rotatable member in a single direction. The rod that extends through the first rail section can be configured to keep the ball striking device from moving around the rotatable member at a fixed height based on which of the one or more cavities the rod extends through. The method can further comprise determining one or more parameters that indicate a quality of a surface. The one or more parameters may be determined based on a travel path of the ball. The method can also comprise storing the determined one or more parameters.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
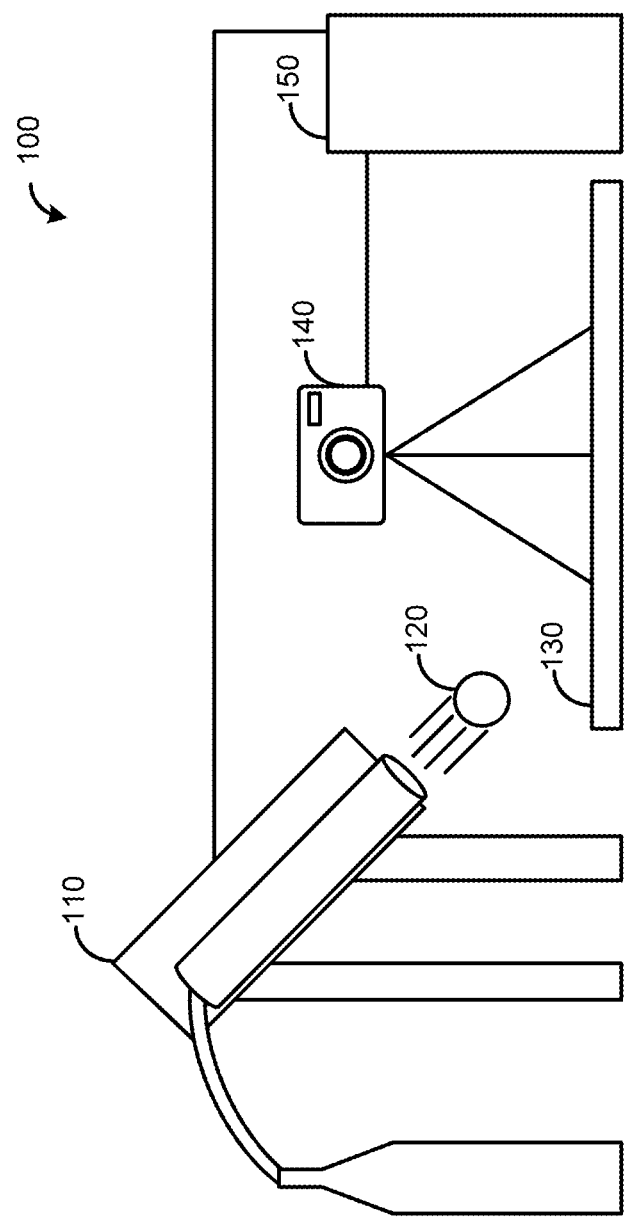
FIG. 1 is a diagram of an example system device for testing a surface.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

The present disclosure relates to an apparatus for determining a quality of a surface. The apparatus is configured to allow for consistency of testing a surface to determine one or more parameters for the surface. For example, the apparatus allows for a ball to be struck with a consistent amount of force in a consistent direction so that an amount of force transferred to the ball is consistent across different tests. Additionally, the apparatus is portable such that the testing apparatus can be used at a plurality of locations (e.g., different golf courses, different surfaces, etc.). Thus, the apparatus is configured to allow for consistent testing of the one or more parameters across a variety of surfaces, as well as a variety of locations.

FIG. 1 is a block diagram depicting non-limiting examples of a system 100 comprising a launcher device 110, a camera 140, and a computing device 150. The launcher device 110 may be configured to launch an object 120 at a surface 130. The launcher device 110 may be configured to propel an object (e.g., a ball) by any suitable means. In an example, the launcher device 110 may be configured to expel the ball from a tube, for instance, for instance by way of an applied air pressure or other propulsion mechanism. In an example, the launcher device 110 may be configured to propel the ball by mechanical means such as striking the ball. The object 120 may be a ball. The object 120 may be a baseball, a golf ball, a soccer ball, a football, a basketball, or a tennis ball. The surface 130 may be a playing surface. The surface 130 may be a playing surface. The surface 130 may be a baseball field, a golf course, a soccer field, a football field, a basketball court, polo grounds, a cricket field, a tennis court, or the like. The camera 140 may be configured to record a video of the object 120 before, during, and after the object 120 interacts (e.g., contacts, bounces) with the surface 130. Video data generated by the camera 140 may be provided to the computing device 150 for analysis by an interaction engine 1501. The interaction engine 1501 may comprise the interaction engine 1401.

The launcher device 110 may be a cannon or other launch device configured to launch the object 120 in varying angles and at varying speeds. The launcher device 110 may be configured to launch the object 120 by any means. For example, the launcher device 110 may be configured to use air pressure or other propellant means (e.g., explosives) to expel the object from a barrel with an angle and a velocity. For example, the launcher device may be configured to use mechanical means (e.g., striking, or use of elastic methods) to impart a force on the object resulting in the object accelerating. The angle at which the object 120 is launched may be controlled by tilting the barrel of the launcher device 110 to the desired angle. The speed at which the object 120 is launched may be controlled by a user interface such that the object 120 may be launched at various speeds. The launcher device 110 may thus mimic interactions between the object 120 and the surface 130 that commonly occur during game play (e.g., dribble of a basketball, baseball striking the turf after being hit by a bat, and the like). The launcher device 110 may be configured to recreate conditions, such as speed and trajectory, of the object 120 immediately before the object 120 comes in contact (bounces) with the surface 130.

The launcher device 110 may comprise a main frame. The main frame may be made of any suitable materials such as steel, aluminum, wood, plastic, or the like. Front uprights may be slotted so a cannon housing member of the frame can be positioned close to the ground for the lower line drive surface contact method. The main frame may be configured to accommodate the barrel (e.g., the barrel of a cannon). A pressurized cannon may be attached to the main frame. The cannon may comprise a CO2 cannon, which may comprise a CO2 controlled valve with a push button release, a cradle which secures the cannon, hosing and a regulator for pressure adjustments, and pneumatic casters on one side of the frame. The launcher device may be fixed to the ground or may be mobile. For example, the launcher device 110 may be flipped up on its side for ease of transporting. The launcher device 110 may be powered by a regulated psi to achieve the desired speed of the ball as it is shot out of the launcher device 110. A correlation between pressure and speed may be determined to provide control over a speed at which the object 120 may be launched. For example, the average baseball speed leaving a Major League Baseball (MLB) player hit is approximately 110 miles per hour (MPH). The object launcher may be pressurized with CO2 at pressure per square inch (PSI) ranging from 200-320 PSI. The launcher device 110 may be used to launch the object 120 at varying PSIs and the resulting speed measured (e.g., by chronograph) in feet per second (FPS) and converted to MPH.

The launcher device 110 may simulate the precise angle and speed of the object 120 immediately before contact with the surface 130. By regulating the pressure +/−, the speed of the object 120 can be determined. Increasing psi increases the speed of the object 120 while decreasing the psi decreases the speed. "Three points of contact" on the frame of the launcher device 110 may be used to position different angles. In a baseball context, simulating a "bunt" will produce launch with a very slow speed and high angle. By decreasing the psi and increasing the angle, such as 45 degrees, the launcher device 110 can simulate a bunt. This setting can also be used to simulate what happens when a "fly ball" drops into the outfield. The launcher device 110 may also simulate a "line drive" by increasing the psi and lowering the angle, such as 10 degrees, to simulate the conditions immediately before the baseball comes in contact with the baseball field.

The camera 140 may be any type of camera, including visible-light cameras, infrared (IR) cameras, ultraviolet cameras or any other devices (or combination of devices) that are capable of capturing an image of an object and representing that image in the form of digital data. The camera 140 may be configured to capture video images (e.g., successive image frames at a constant rate of at least 15 frames per second (fps)). The camera 140 may be configured to capture video images at framerates such as 120 fps and/or 240 fps. The particular capabilities of the camera 140 may vary, based on application, as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the object 120, the volume of interest might be one or more meters. The camera 140 may be oriented in any convenient manner. In the system 100, the camera 140 is mounted so that a field of view of the camera 140 will include the object 120 before, during, and after contact with the surface 130. More than one camera 140 may be used and may be arranged to provide overlapping fields of view throughout the area where motion of the object 120 is expected to occur. The camera 140 may provide captured image and/or video data to the computing device 150.

In operation, the launcher device 110 launches the object 120 at the surface 130. The launcher device 110 can be operated using the object launch module 1510 (as described in FIG. 15) of the interaction engine 1501 or the launcher device 110 can be operated manually. The camera 140 is operated to collect a sequence of images of the object 120. The images are timestamped. These images are provided to the computing device 150 and are then analyzed, e.g., using the interaction engine 1501, to determine a position of the object 120 as it travels to the surface 130, contacts the surface 130, travels away from the surface 130, or a combination thereof. The camera 140 may be triggered to acquire images in conjunction with the firing of the launcher device 110.

Figure 2:
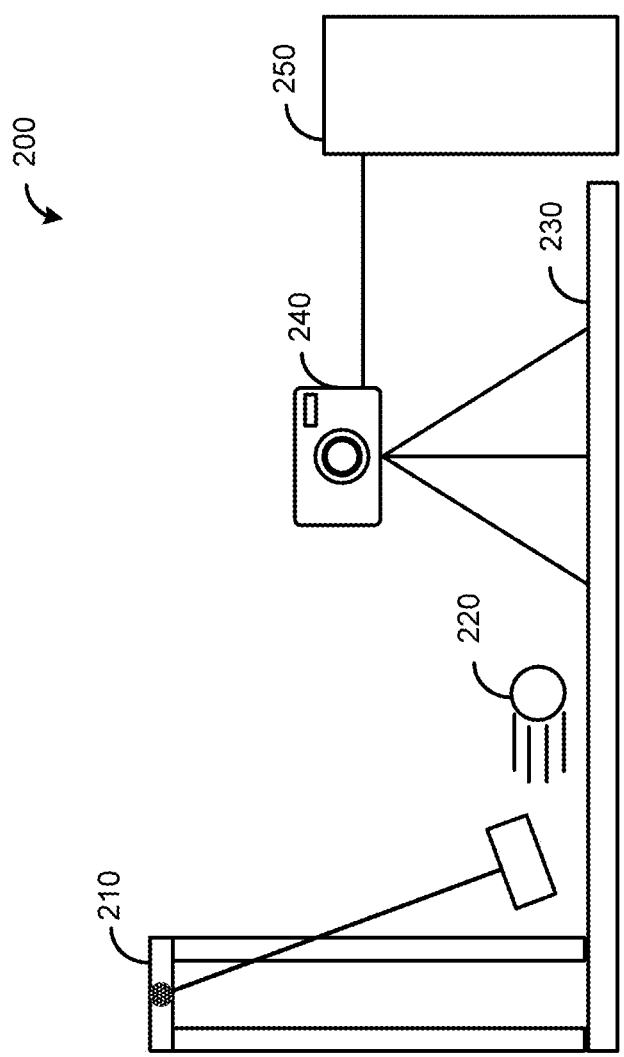
FIG. 2 is a diagram of an example system device for testing a surface.

FIG. 2 is an example of a system 200 for testing a surface. The system 200 may comprise a ball striking device 210, a camera 240, and a computing device 250. The ball striking device 210 may be configured to launch a ball 220 at or across a surface 230. The ball 220 may be a golf ball, a baseball, a soccer ball, a football, a basketball, a lacrosse ball, a polo ball, a tennis ball, or the like. The surface 230 may be a playing surface. The surface 230 may be a golf course, a baseball field, a soccer field, a football field, a basketball court, a tennis court, a lacrosse field, polo grounds, cricket filed, or the like. The playing surface 230 can comprise artificial turf configured to varying parameters determining on the use of the artificial turf. The camera 240 may be configured to record a video of the ball 220 before, during, and after the ball 220 interacts (e.g., contacts, bounces, rolls across, etc.) with the surface 230. Video data generated by the camera 240 may be provided to the computing device 250 for analysis by an interaction engine 1501.

The ball striking device 210 may be configured to recreate conditions, such as speed and trajectory, of the ball 220 immediately before the ball 220 comes in contact (bounces) with the surface 230. For example, the ball striking device 210 can be configured to mimic a putting stroke, a chip, a pitch, a full golf swing, and so forth.

The camera 240 may be any type of camera, including visible-light cameras, infrared (IR) cameras, ultraviolet cameras or any other devices (or combination of devices) that are capable of capturing an image of a ball and representing that image in the form of digital data. The camera 240 may be configured to capture video images (e.g., successive image frames at a constant rate of at least 2 frames per second (fps)). The camera 240 may be configured to capture video images at frame rates such as 120 fps and/or 240 fps. The particular capabilities of the camera 240 may vary, based on application, as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the ball 220, the volume of interest might be one or more meters. The camera 240 may be oriented in any convenient manner. In the system 200, the camera 240 can be mounted so that a field of view of the camera 240 will include the ball 220 before, during, and after contact with the surface 230. Additionally, the camera 240 can be mounted so that a field of view of the camera 240 will include the ball 220 as the ball rolls across the surface 230. More than one camera 240 may be used and may be arranged to provide overlapping fields of view throughout the area where motion of the ball 220 is expected to occur. The camera 240 may provide captured image and/or video data to the computing device 250.

Figure 3:
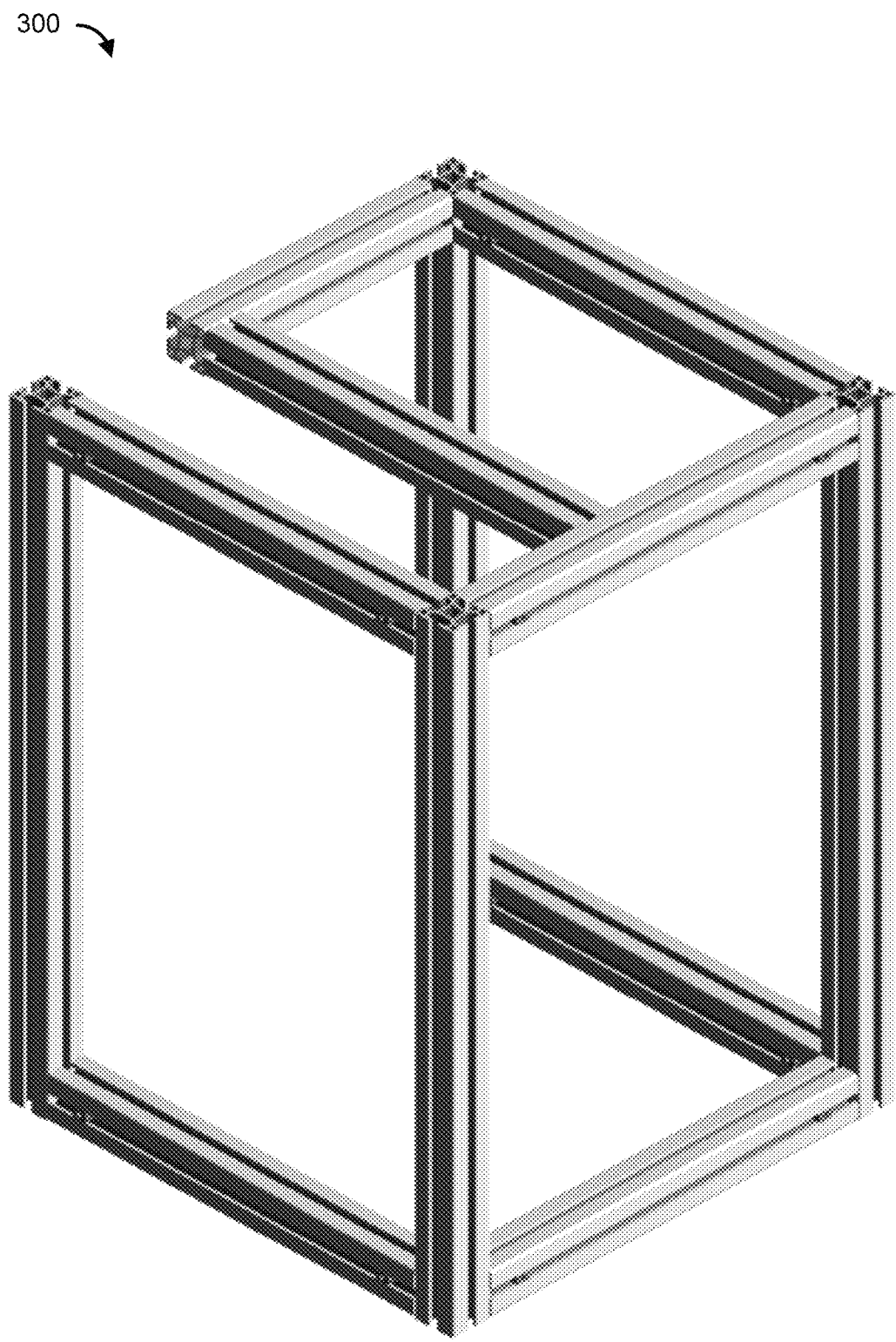
FIG. 3 is an example device for testing a surface.

FIG. 3 is a diagram of an example device 300 for testing a surface. The device 300 comprises a frame with a plurality of rail sections. The frame is configured to couple with the launching device, a clamping member, or various other attachments as will be described in more detail below. As will be appreciated by one skilled in the art, the device 300 is merely one example of a frame and there are a plurality of different frame options that can be coupled with the clamping member described below. Accordingly, the present disclosure should not be limited to the frame as shown in FIG. 3.

Figure 4:
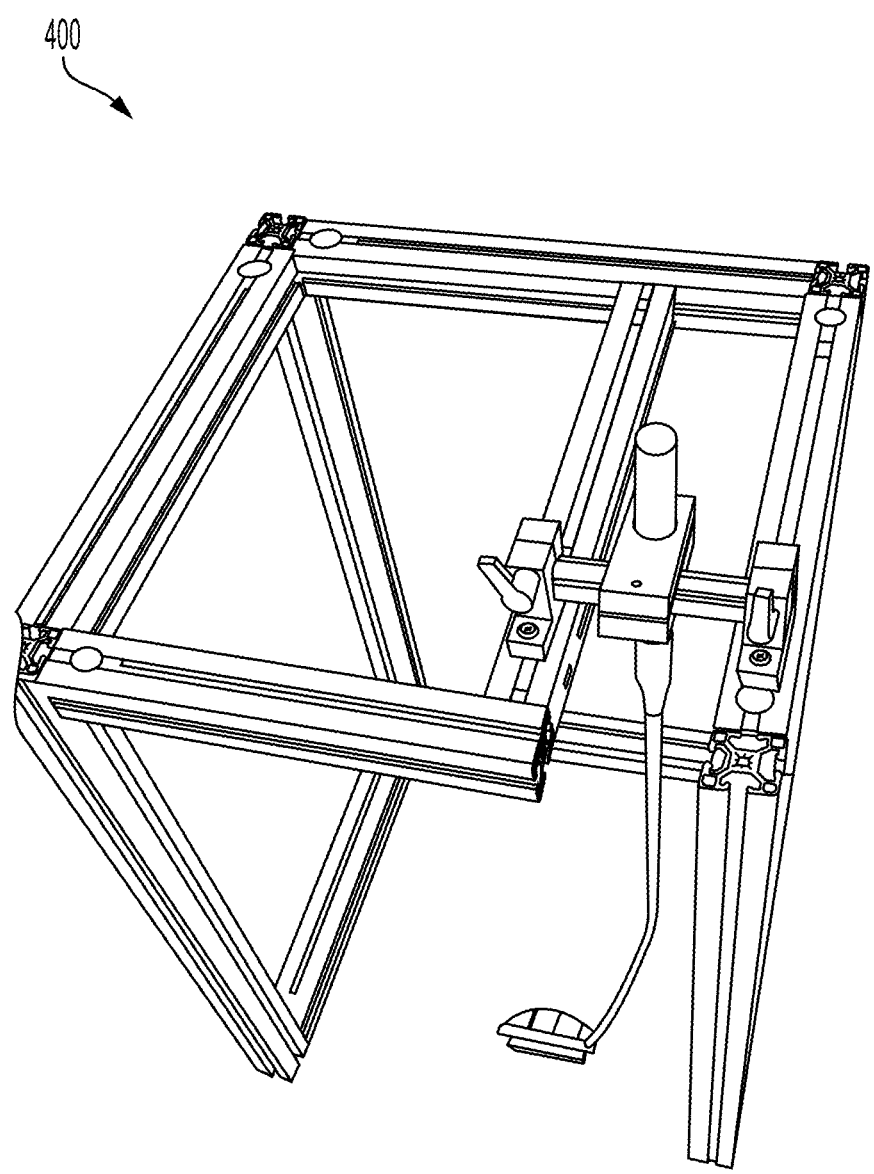
FIG. 4 is an example device for testing a surface.

FIG. 4 is a diagram of an example device 400 for testing a surface. As shown, the device 400 can comprise the frame comprising a plurality of rail sections. A first rail section of the plurality of rail sections can comprise one or more cavities configured to receive a rod that extends through the first rail section.

The apparatus can also comprise a rotatable member coupled to a second rail section of the plurality of rail sections and a third rail section of the plurality of rail sections. The rotatable member can be configured to couple a ball striking device to the frame such that the ball striking device is free to rotate around the rotatable member in a single direction. The ball striking device can comprise at least one of a mallet, a golf club, a putter, a baton, a staff, a piston, or a ball striking rod.

The rotatable member can further comprise a clamping member configured to securely couple the ball striking device to the rotatable member. The clamping member can be configured to clamp to a handle portion of the ball striking device. The clamping member can be configured to not damage the handle portion of the ball striking device when the clamping member securely couples the ball striking device to the rotatable member. Additionally, the clamping member can be configured to quickly disengage (e.g., unclamp) the ball striking device such that the ball striking device can be easily removed from the device 400.

The rod that extends through the first rail section can be configured to keep the ball striking device from moving around the rotatable member at a fixed height based on which of the one or more cavities the rod extends through. For example, when the rod is removed from the one or more cavities, the rotatable member is configured to rotate the ball striking device in the single direction at a speed that is dictated based on which of the one or more cavities the rod extends through prior to removal. The ball striking device can be configured to strike a ball when the rod is removed to cause the ball to move in a path of travel away from the ball striking device.

Figure 5:
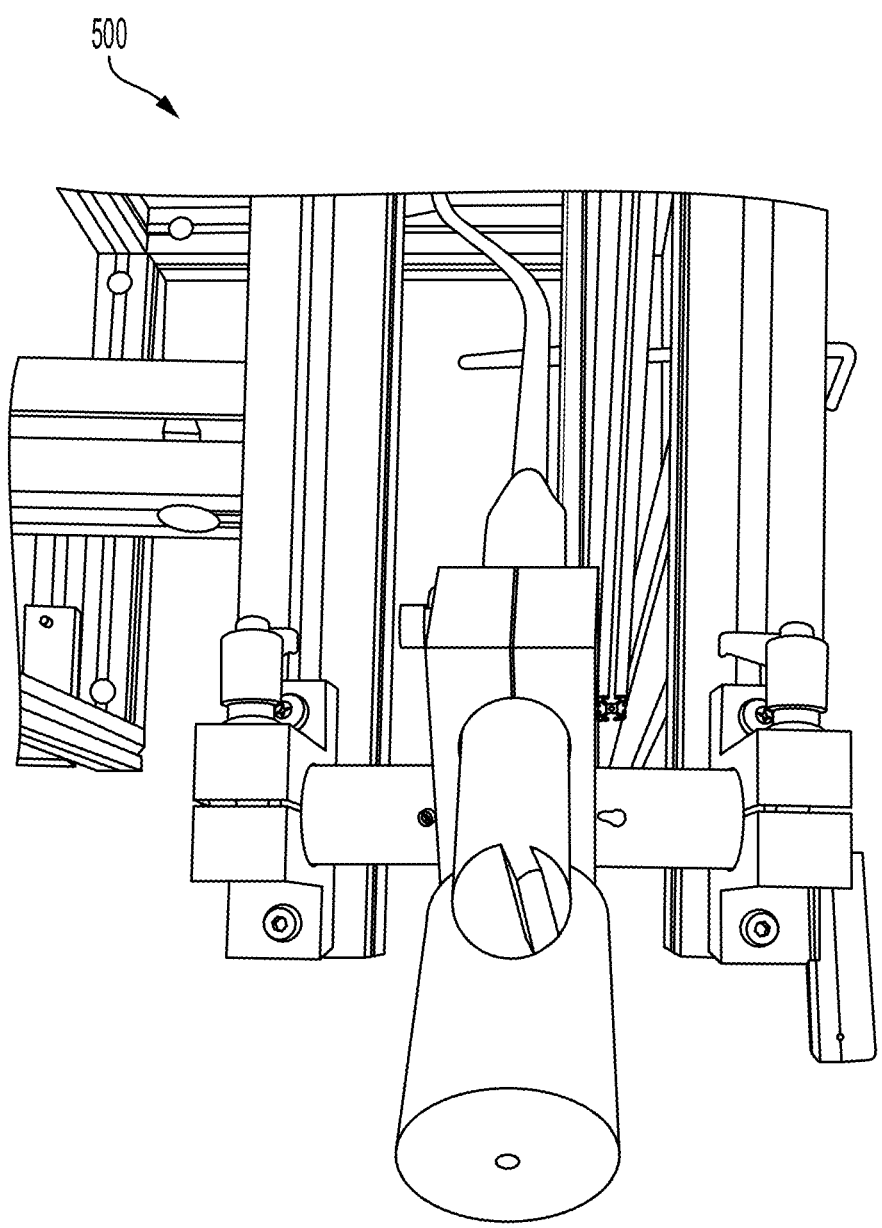
FIG. 5 is a close up diagram of a clamp member of an example device for testing a surface.

FIG. 5 is a close up diagram of a clamp member 500 of an example device for testing a surface. As shown, the clamping member 500 is configured to securely couple the ball striking device to the rotatable member (e.g., a rod coupled between two rails of the frame). The clamping member can be configured to clamp to a handle portion of the ball striking device. The clamping member can be configured to not damage the handle portion of the ball striking device when the clamping member securely couples the ball striking device to the rotatable member. The clamping member can further comprise one or more counterweights configured to counterbalance the ball striking device such that the ball striking device is balanced at a point near where the clamping member couples the ball striking device to the rotatable member. Additionally, the clamping member can be configured to quickly disengage (e.g., unclamp) the ball striking device such that the ball striking device can be easily removed from the device 200. For example, if the striking device is a putter, the clamping member can be disengaged to remove the putter and to replace the putter with another striking device, such as a golf club (e.g., a wedge, an iron, a driver, etc.). Accordingly, the clamp member 500 may be configured to allow for interchangeability between a plurality of striking devices in an efficient manner.

Figure 6:
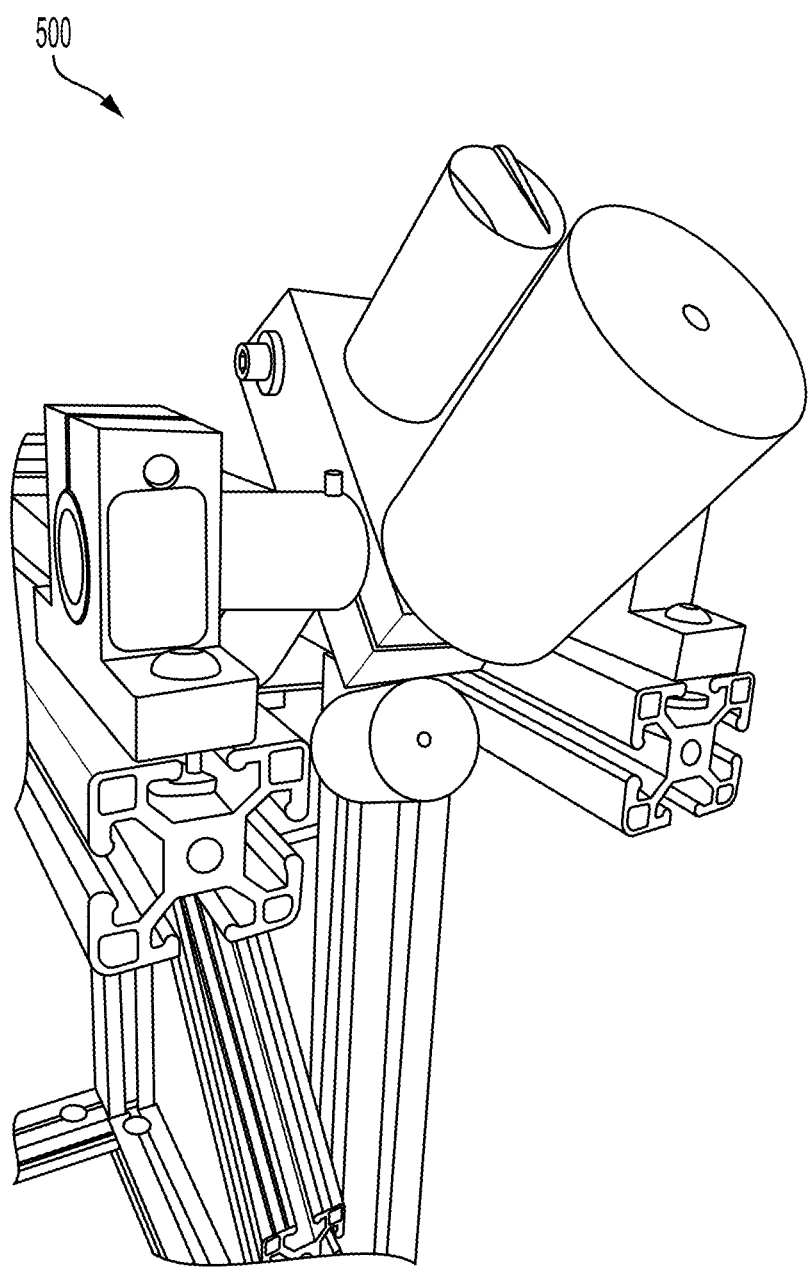
FIG. 6 is a close up diagram of a clamp member of an example device for testing a surface.

FIG. 6 is a close up diagram of the clamp member 500 of an example device for testing a surface. FIG. 6 comprises a different angle of the clamp member 500 of FIG. 5. As shown, the clamp member comprises a plurality of counterweights. A first counterweight can be placed on top of the clamping member and a second counterweight can be placed on the bottom of the clamping member. While two counterweights are shown for ease of explanation, a person of ordinary skill in the art would appreciate that the clamp member 500 may comprise any number of counterweights, including no counterweights, and that the counter weights can be located anywhere on the clamp member 500. Accordingly, the present disclosure should not be limited to the exemplary embodiment shown in FIG. 6.

Figure 7:
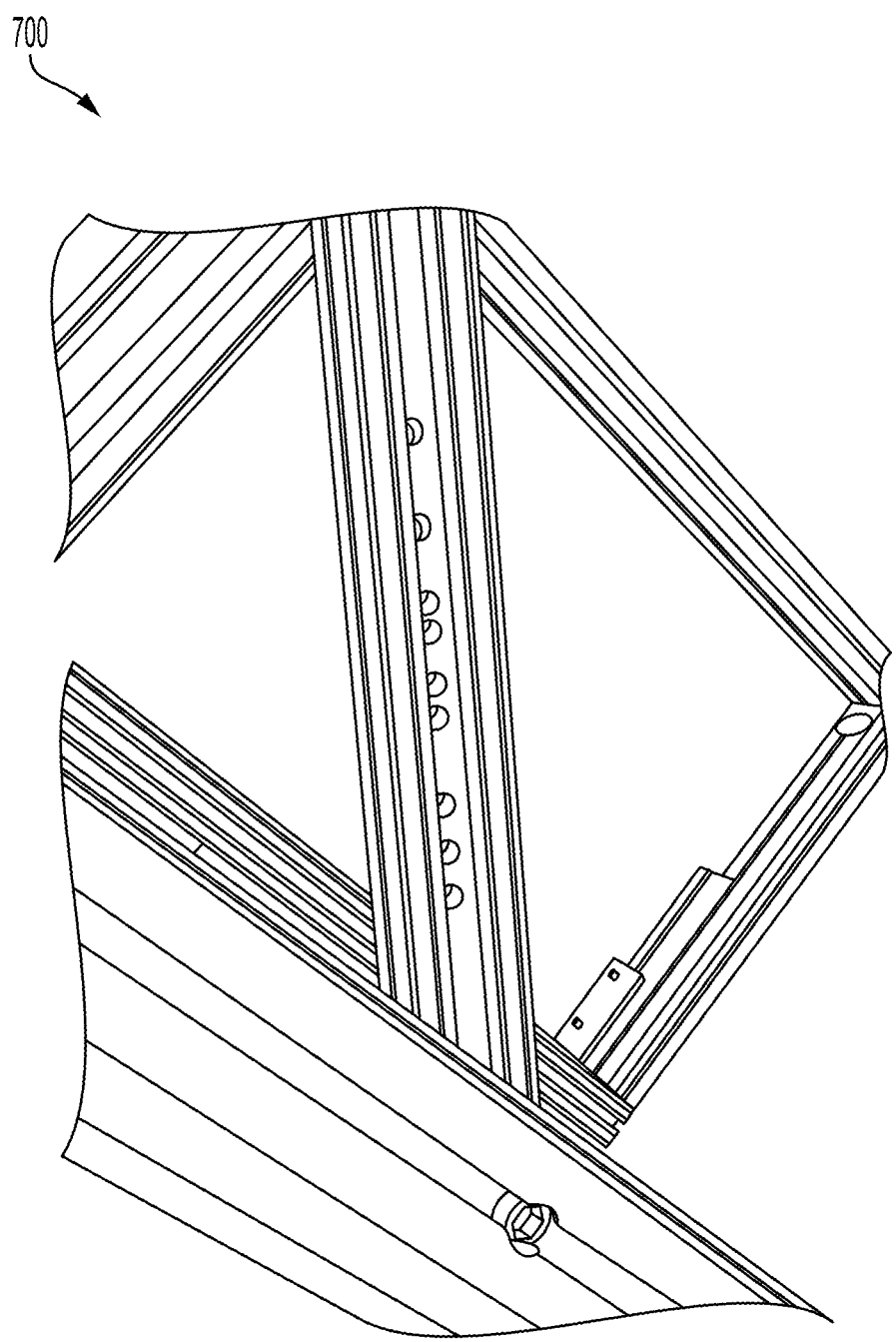
FIG. 7 is a diagram of a frame member of an example device for testing a surface.

FIG. 7 is a diagram of a frame member 700 of an example device for testing a surface. As shown, the frame member 700 comprises a plurality of cavities (e.g., holes) configured to receive a rod (not shown). The rod is configured to extend through the plurality of cavities so as to engage with the ball striking device such that the ball striking device is held in place by the rod. When the rod is removed from the frame member 700, the ball striking device is configured to freely rotate about the rotatable member. Specifically, the ball striking device is configured to utilize gravity to move towards a ball in order to strike the ball in a direction of travel. Further, each of the plurality of cavities has a respective height, which dictates a speed of travel of the ball striking device. For example, the further away from the base of the frame the cavity is located, the faster the ball striking device travels. Thus, the path of travel of the ball that the ball striking device hits will be dictated based on which of the plurality of cavities the rod is placed through to hold the ball striking device at a predetermined height.

The plurality of cavities allows for the ball striking device to behave in consistent manner. For example, because each of the heights is predetermined for each of the cavities, the ball striking device will travel at approximately a same rate of speed for each respective cavity. Stated differently, each of the plurality of cavities is associated with a respective speed of travel of the ball striking device. Accordingly, the plurality of cavities allows for consistency of testing regardless of the surface being tested because the speed of the ball striking device will be approximately the same when the ball striking device is released from the same cavity. Therefore, the plurality of cavities allows for consistency of testing the surface.

Figure 8:
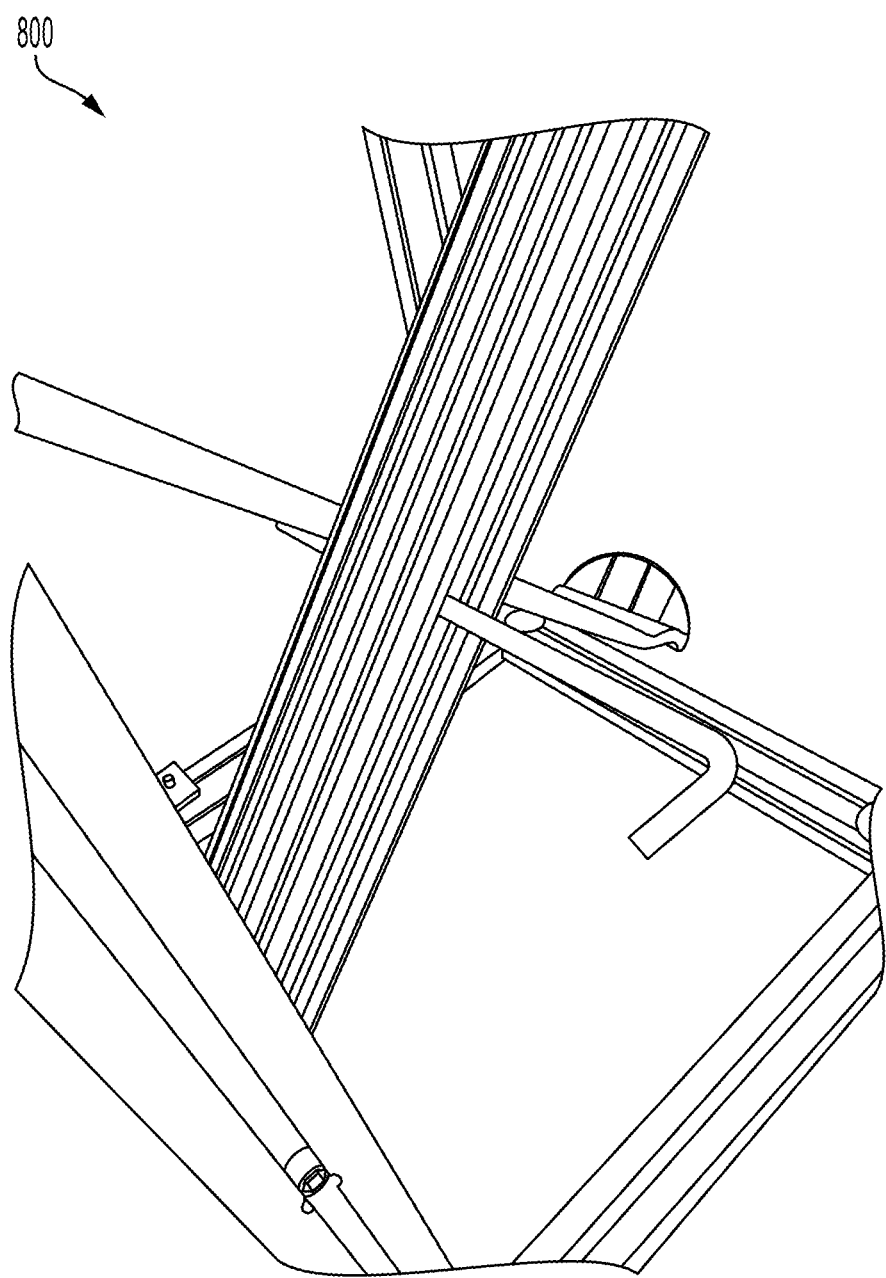
FIG. 8 is a diagram of a frame member of an example device for testing a surface.

FIG. 8 is a diagram of a frame member 800 of an example device for testing a surface. Specifically, FIG. 8 illustrates the frame member 800 with the rod inserted within one of the plurality of cavities. As shown, the rod prevents the ball striking device from moving until the rod is removed from the cavity. Additionally, FIG. 8 highlights the ability for a cavity to have a consistent speed of the ball striking member due to the ball striking member being held at a same height. Furthermore, while the plurality of cavities are not visible in FIG. 8, the plurality of cavities are within the frame member 800. Thus, the ball striking device can be held as shown in FIG. 8 at any one of the plurality of cavities so that the speed of the ball striking device can be varied to test different conditions of the surface.

While FIGS. 2-8 describe the device as operating via gravity, the devices as described in FIGS. 2-8 can be operated by one or more powered devices. The one or more powered devices can comprise one or more of a motor, a drive, a spring, a gearbox, a shaft coupled to the gear box, and so forth. For example, the rotatable member can be coupled to an electric motor that forcibly rotates the rotatable member. The electric motor can be configured to accelerate the striking device at a particular speed. For example, the electric motor can be configured to accelerate the striking device up to 100 MPH to replicate the swing speed of a low handicap golfer. As another example, the electric motor can be configured to replicate a 50% swing to test how the surface operates and/or reacts to a variety of swings and/or shots that the surface would experience if implemented on a championship caliber golf course. While the rotatable member is used for ease of explanation, a person of ordinary skill in the art would appreciate that any portion of the devices as shown in FIGS. 2-8 can be coupled to one or more motors to control the operation and/or movement of the said devices.

Figure 9:
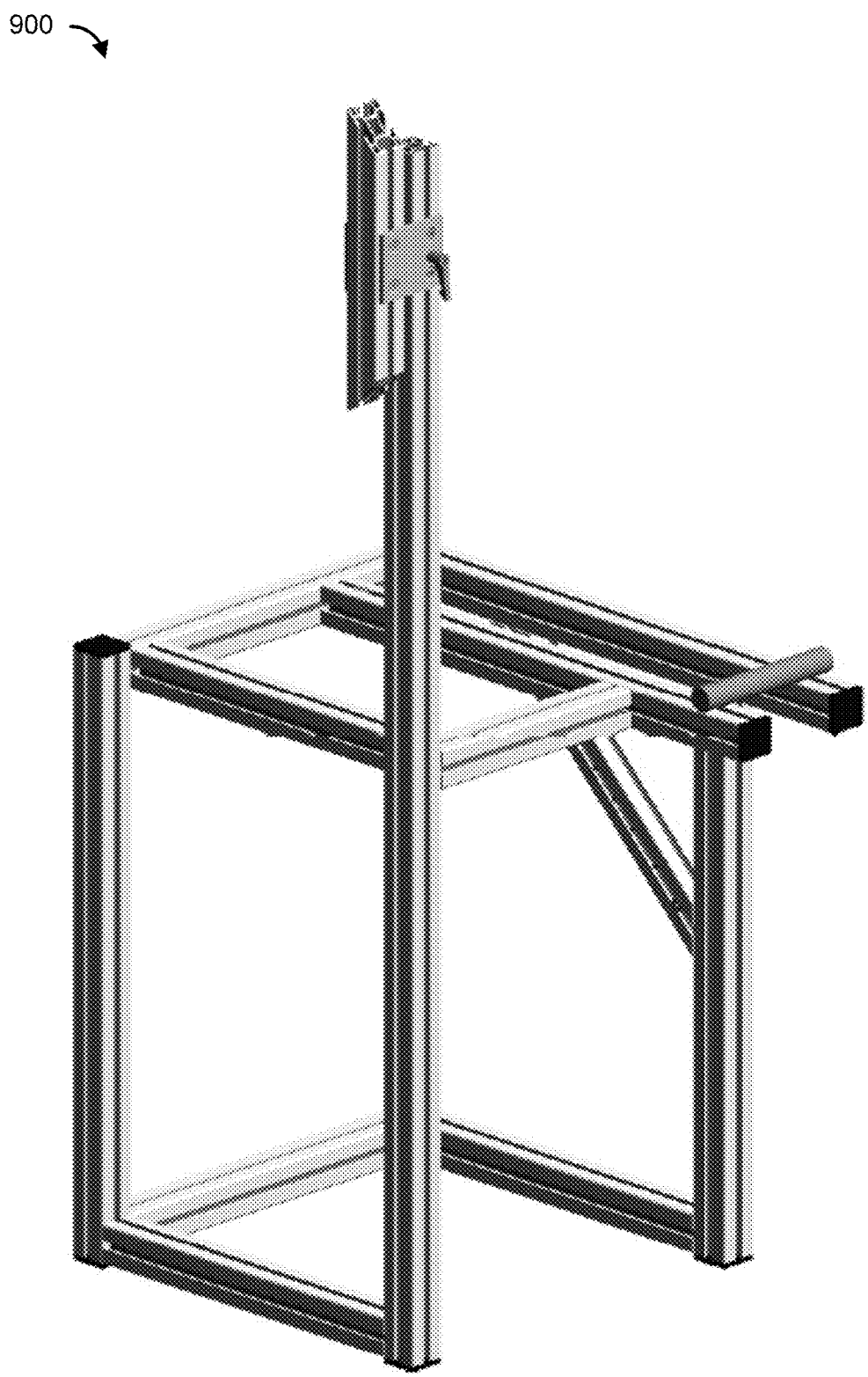
FIG. 9 is a diagram of an example device for testing a surface.

FIG. 9 is a diagram of an example device 900 for testing a surface. The example device 900 is similar to the devices described in FIGS. 2-8, but the example device 900 comprises a golf ball launching member. As shown, the golf ball launching member extends over the top of the frame of the example device 900. The golf ball launching member is configured to mimic the impact from a golf club, such as an iron, a wedge, a driver, etc. The golf ball launching member is configured to strike the ball and cause the ball to launch off a platform. The platform can be located on top of the frame, the bottom of the frame, or any other portion of the frame. The location of the platform dictates a height of travel for the ball. For example, if the ball is launched from a platform on top of the frame, the ball will travel farther, as compared to a platform on the bottom of the frame.

Figure 10:
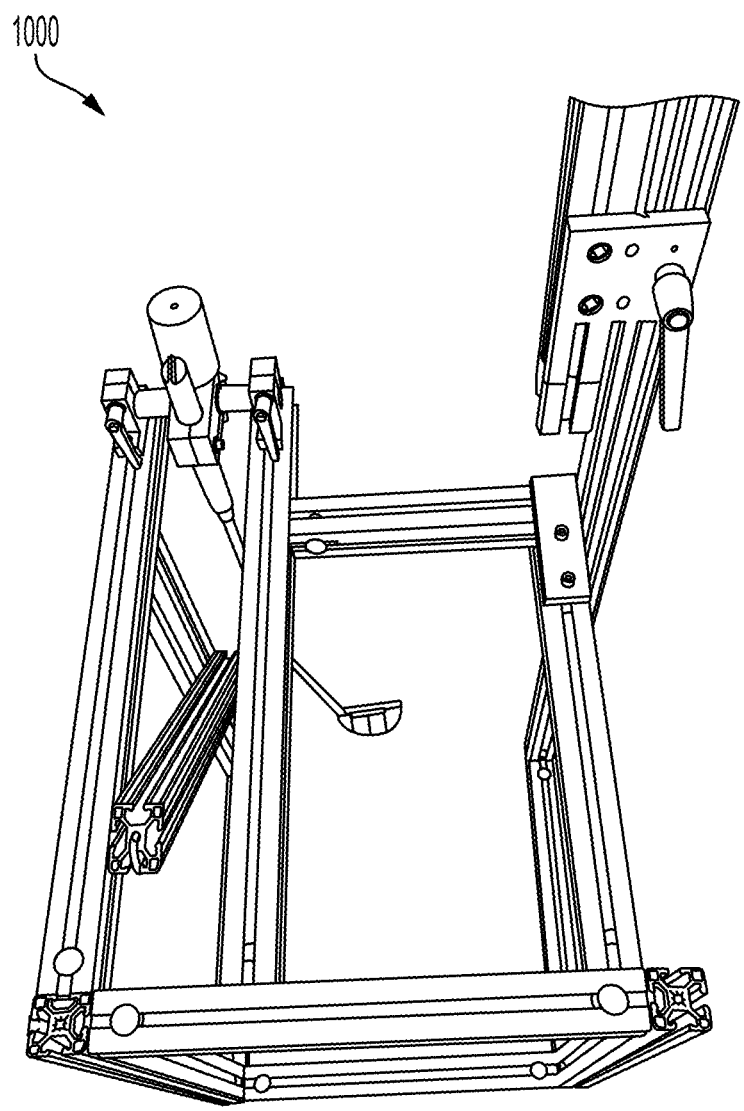
FIG. 10 is a close up diagram of a ball launching member of an example device for testing a surface.

FIG. 10 is a diagram of an example device 1000 for testing a surface. As shown, the example device 1000 comprises the rotatable member coupled to the ball striking device, as well as the ball launcher and a platform for launching the ball. Specifically, the example device 1000 is a combination of the example device 400 and the example device 900 such that the example device 1000 comprises the capability to strike a ball, as well as launch a ball as described below.

Figure 11:
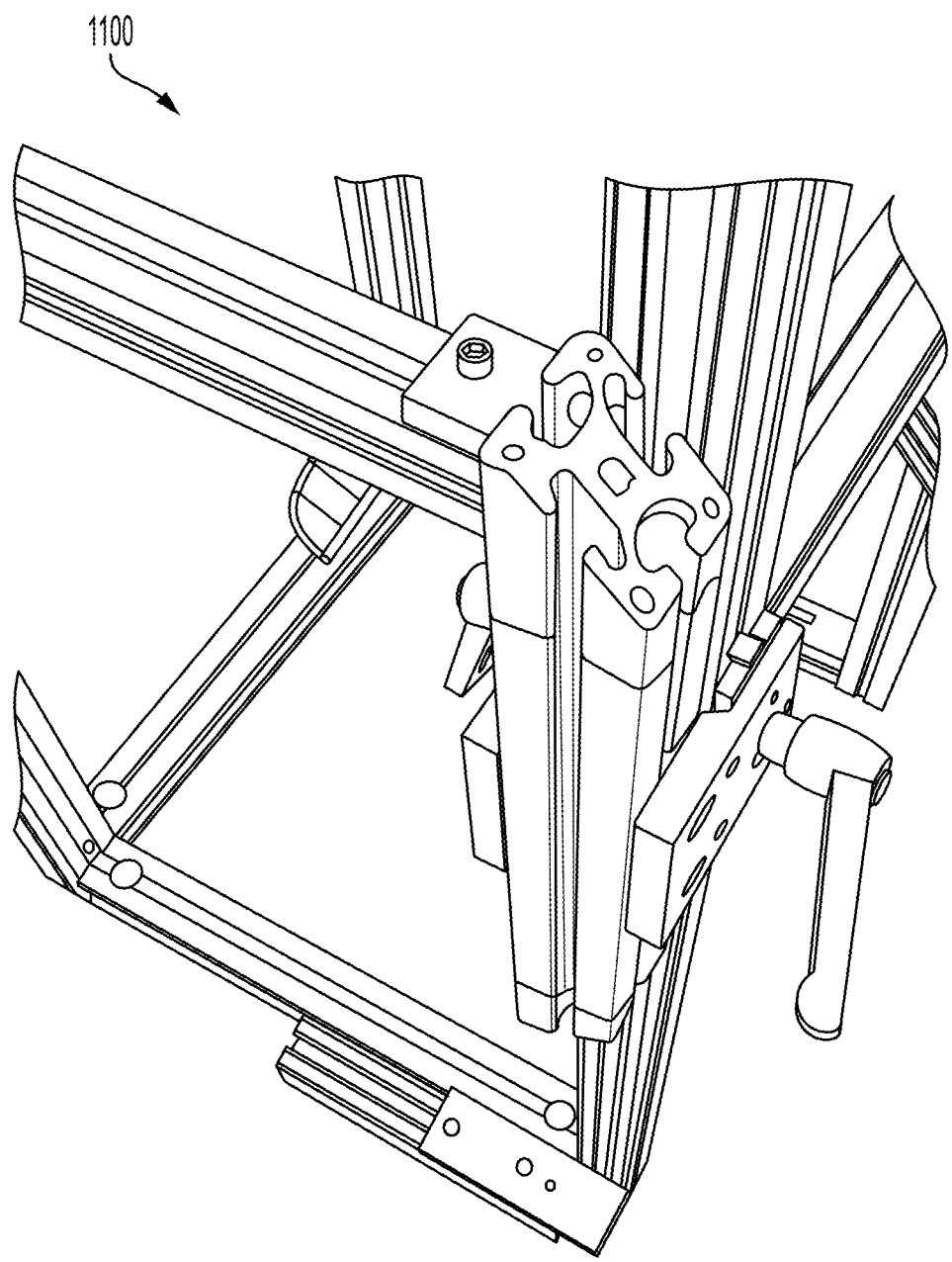
FIG. 11 is a close up diagram of a ball launching member of an example device for testing a surface.

FIG. 11 is a close up diagram of a ball launching member 1100 of an example device for testing a surface. As shown, the ball launching member 1100 comprises a first end and a second end. The first end can comprise a first angled end configured to launch the ball at a first predetermined launch angle, and the second end can comprise a second angled end configured to launch the ball at a second predetermined launch angle. The ball launching member can be configured to provide a backspin on a ball to mimic a stroke and/or a swing from a golf club other than a putter. Thus, the ball launching member can be configured to mimic a chip and/or a pitch so that the surface can be test to determine how the surface reacts to the ball impacting the surface. The ball launching member can be configured to strike the ball on a platform or not on a platform (e.g., on the playing surface, or another location).

For example, the first angled end and the second angled end can be configured to be similar to an angle of a golf club. As an example, a sand wedge can have a face angle of approximately 54 degrees and a lob wedge can have a face angle of approximately 60 degrees. The first angled end can have a similar angle as the sand wedge, and the second angled end can have a similar angle as the lob wedge. Thus, depending on whether the first or second angled end is utilized (e.g., makes contact with the ball), the path of travel of the ball will vary. As an example, the ball will have an increased distance of travel (e.g., away from the ball launching member 1100), when the first angled end is used, whereas when the second angled end is used, the ball may have an increased height of travel (e.g., away from the bottom of the device). Accordingly, the ball launching member can be configured to mimic a swing and/or a stroke of a golf club other than a putter. While a sand wedge and a lob wedge were used for ease of explanation, a person skilled in the art would appreciate that the first and second angled ends can comprise any angle, and should not be limited to the aforementioned example or even angles of a golf club.

The ball launching member can comprise a polymeric material and/or coating on the first angled end or the second angled end. The polymeric material can be configured to increase the coefficient of friction between the ball launching member and the golf ball. For example, if a primary material of the ball launching member is metal, the polymeric material may be added to increase the friction between the ball and the ball launching member because the metal of the ball launching member may not have a sufficiently high coefficient of friction to launch the ball. The polymeric material can be any polymeric material.

Figure 12:
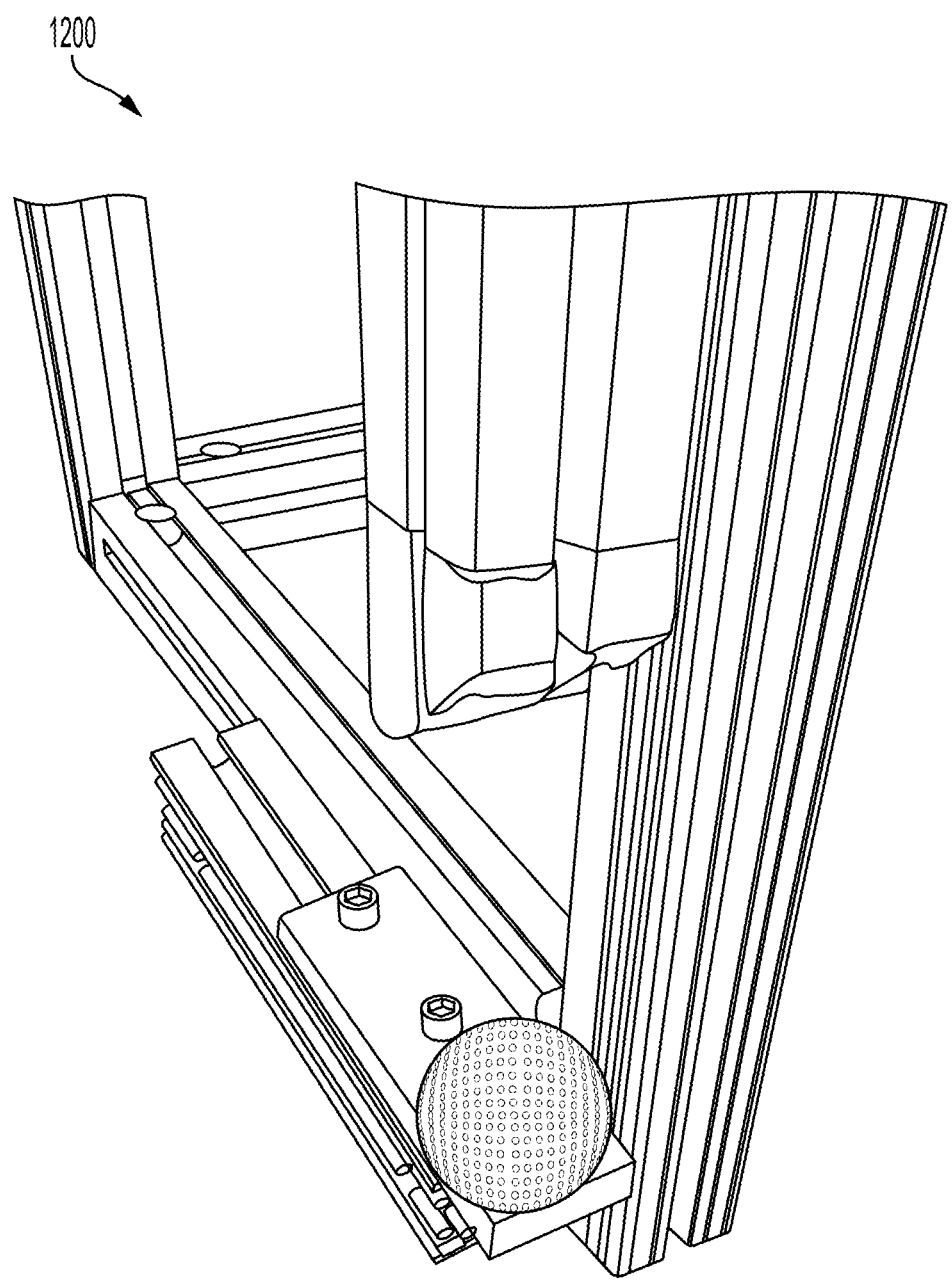
FIG. 12 is a close up diagram of a ball launching member of an example device for testing a surface.

FIG. 12 is a close up diagram of a ball launching member 1200 of an example device for testing a surface. As shown, the ball launch member 1200 is suspended over a platform. As shown in FIG. 12, the platform is located at a bottom of the frame, and the platform is holding a golf ball. The launch member 1200, when released, can be configured to strike the golf ball on the platform and to launch the golf ball in a path of travel away from the launch member. The path of travel may include a height (e.g., travel in the Z plane), as well as distance (e.g., travel in the X plane).

While FIGS. 8-12 describe the device as operating via gravity, the devices as described in FIGS. 8-12 can be operated by one or more powered devices. The one or more powered devices can comprise one or more of a motor, a drive, a spring, a gearbox, a shaft coupled to the gear box, and so forth. For example, the ball launching member 1000 of FIG. 10 can be coupled to an electric motor that accelerates or decelerates the launching member to a particular speed. For example, the electric motor can be configured to accelerate the ball launching member up to 100 MPH to replicate the swing speed of a low handicap golfer. As another example, the electric motor can be configured to replicate a 50% swing to test how the surface operates and/or reacts to a variety of swings and/or shots that the surface would experience if implemented on a championship caliber golf course. While the rotatable member is used for ease of explanation, a person of ordinary skill in the art would appreciate that any portion of the devices as shown in FIGS. 8-12 can be coupled to one or more motors to control the operation and/or movement of the said devices.

Figure 13:
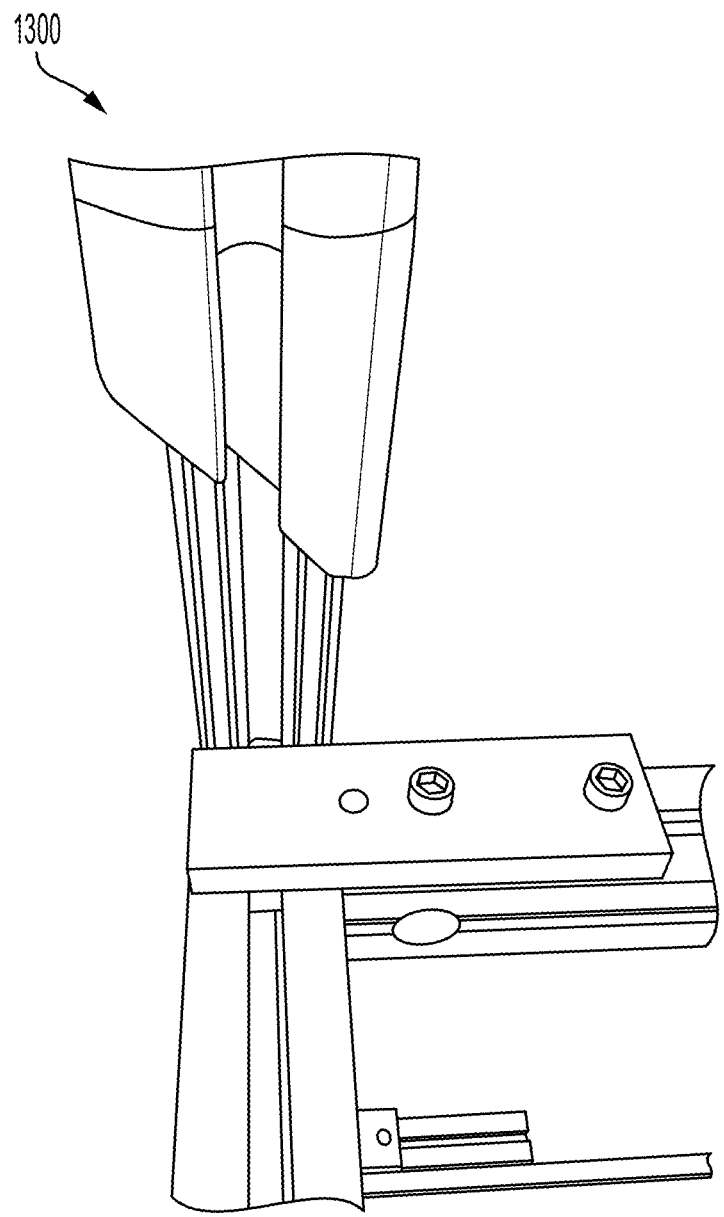
FIG. 13 is a close up diagram of a ball launching member of an example device for testing a surface.

FIG. 13 is a close up diagram of a ball launching member 1300 of an example device for testing a surface. The ball launching member 1300 is similar to the ball launching member 1100, except that the platform is located at a top of the frame instead of the bottom. Accordingly, a height of travel of a ball launched by the ball launching member 1300 can be larger than the ball launching member 1100 because the ball launching member 1300 is launching the ball from a location that is higher than the ball launching member 1100.

Figure 14:
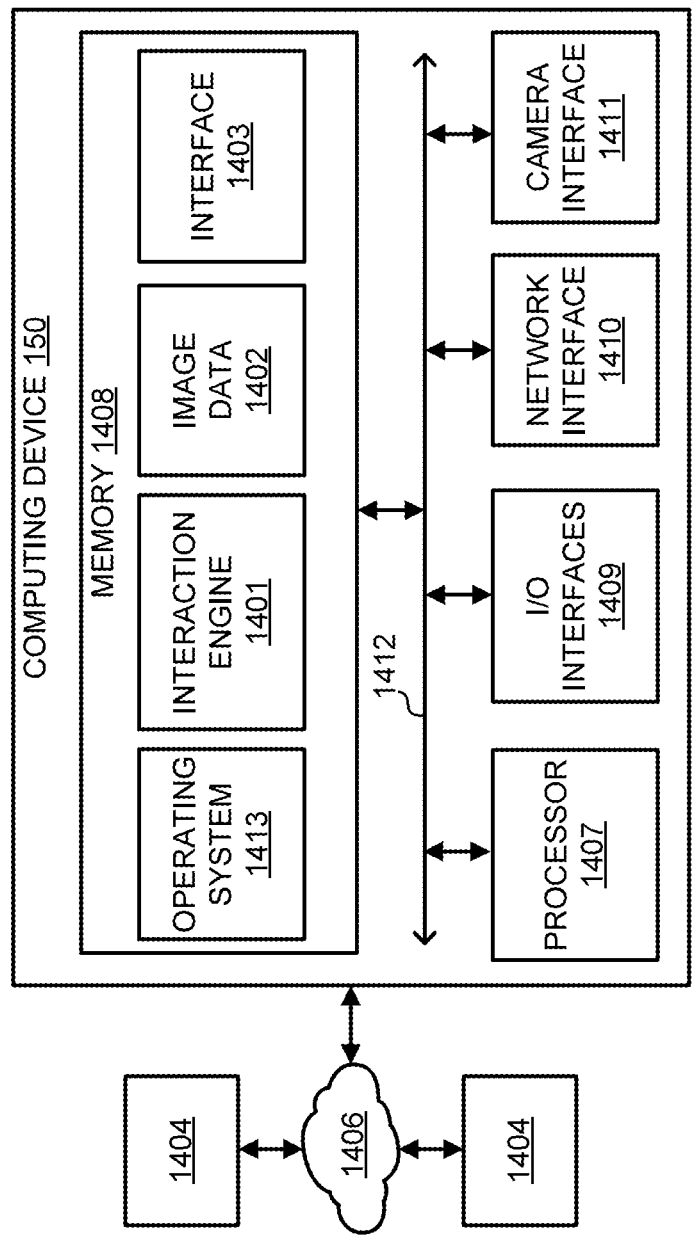
FIG. 14 is a block diagram depicting a non-limiting example of a system for testing a surface.

FIG. 14 is a block diagram depicting a non-limiting example of the computing device 150 (or 250) and the camera 140 (or 240). In an aspect, some or all steps of any described method may be performed on a computing device as described herein. The computing device 150 can comprise one or multiple computers configured to store one or more of an interaction engine 1501 and image data 1402, and to operate a user interface 1403 (e.g., via a web browser) such as, for example, a mobile phone, a tablet computer, a laptop computer, or a desktop computer. Multiple other computing devices 1404 can connect to the computing device 150 through a network 1406 such as, for example, the Internet.

The computing device 150 can be a digital computer that, in terms of hardware architecture, generally includes a processor 1407, memory 1408, input/output (I/O) interfaces 1409, network interfaces 1410, and camera interfaces 1411. These components (1407, 1408, 1409, 1410, and 1411) are communicatively coupled via a local interface 1412. The local interface 1412 can be, for example but not limited to, one or more buses or other wired or wireless connections, as is known in the art. The local interface 1412 can have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1407 can be a hardware device for executing software, particularly that stored in memory 1408. The processor 1407 can be any custom made or commercially available processor, a central processing unit (CPU), an auxiliary processor among several processors associated with the computing device 150, a semiconductor-based microprocessor (in the form of a microchip or chip set), or generally any device for executing software instructions. When the computing device 150 is in operation, the processor 1407 can be configured to execute software stored within the memory 1408, to communicate data to and from the memory 1408, and to generally control operations of the computing device 150 pursuant to the software.

The I/O interfaces 1409 can be used to receive user input from and/or for providing system output to one or more devices or components. User input can be provided via, for example, a keyboard and/or a mouse. System output can be provided via a display device and a printer (not shown). I/O interfaces 1409 can include, for example, a serial port, a parallel port, a Small Computer System Interface (SCSI), an IR interface, an RF interface, and/or a universal serial bus (USB) interface.

The network interface 1410 can be used to transmit and receive from the computing device 150 on the network 1406. The network interface 1410 may include, for example, a 10BaseT Ethernet Adaptor, a 100BaseT Ethernet Adaptor, a LAN PHY Ethernet Adaptor, a Token Ring Adaptor, a wireless network adapter (e.g., Wi-Fi), or any other suitable network interface device. The network interface 1410 may include address, control, and/or data connections to enable appropriate communications on the network 1406.

The camera interface 1411 can include hardware and/or software that enables communication between the computing device 150 and the camera 140. Thus, for example, the camera interface 1411 can include one or more data ports to which the camera 140 can be connected, as well as hardware and/or software signal processors to modify data signals received from the camera 140 (e.g., to reduce noise or reformat data) prior to providing the signals as inputs to the interaction engine 1401 executing on the processor 1407. In some embodiments, the camera interface 1411 can also transmit signals to the camera 140, e.g., to activate or deactivate the cameras, to control camera settings (frame rate, image quality, sensitivity, etc.), or the like. Such signals can be transmitted, e.g., in response to control signals from the processor 1407, which may in turn be generated in response to user input or other detected events.

The memory 1408 can include any one or combination of volatile memory elements (e.g., random access memory (RAM, such as DRAM, SRAM, SDRAM, etc.)) and non-volatile memory elements (e.g., ROM, hard drive, tape, CDROM, DVDROM, etc.). Moreover, the memory 1408 may incorporate electronic, magnetic, optical, and/or other types of storage media. Note that the memory 1408 can have a distributed architecture, where various components are situated remote from one another, but can be accessed by the processor 1407.

The software in memory 1408 may include one or more software programs, each of which comprises an ordered listing of executable instructions for implementing logical functions. In the example of FIG. 14, the software in the memory 1408 of the computing device 150 can comprise the interaction engine 1401 (or subcomponents thereof), the interface 1403, and a suitable operating system (O/S) 1413. The operating system 1413 essentially controls the execution of other computer programs, such as the interaction engine 1501 and/or the user interface 1403, and provides scheduling, input-output control, file and data management, memory management, and communication control and related services. The memory 1408 can also include other information used by the interaction engine 1501; for example, the memory 1408 can store image data 1402. The interaction engine 1501 may include instructions for performing motion capture analysis on images supplied from the camera 1540 connected to the camera interface 1411.

Figure 15:
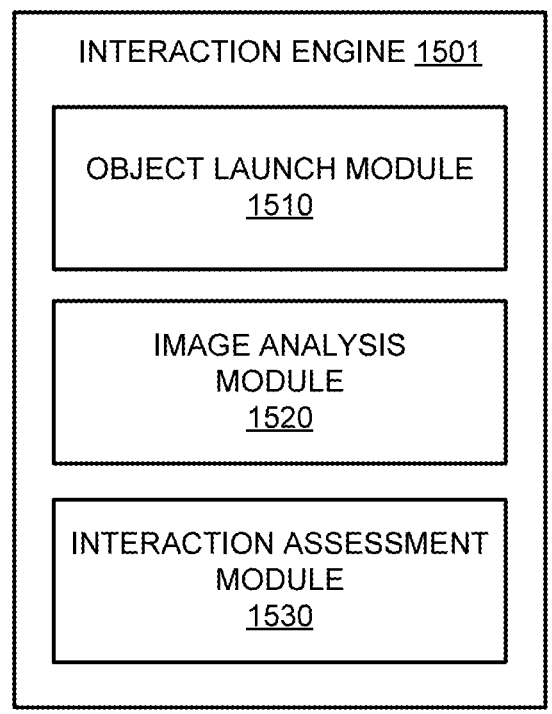
FIG. 15 is a block diagram depicting a non-limiting example of a system for testing a surface.

FIG. 15 shows an embodiment where, the interaction engine 1501 (which may comprise the interaction action 1401) includes various modules, such as an object launch module 1510, an image analysis module 1520, and an interaction assessment module 1530. The object launch module 1510 may be configured to control one or more settings of the ball striking device 1510, including angle and speed of launch, and launch initiation. The image analysis module 1520 can analyze images in the image data 1602, e.g., images captured via the camera interface 1611, to detect edges or other features of the ball 120.

For purposes of illustration, application programs and other executable program components such as the operating system 1413 are illustrated herein as discrete blocks, although it is recognized that such programs and components can reside at various times in different storage components of the computing device 150. An implementation of the interaction engine 1501 and/or the user interface 1603 can be stored on or transmitted across some form of computer readable media. Any of the disclosed methods can be performed by computer readable instructions embodied on non-transitory computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

In operation, the ball striking device 110 strikes the ball 120 towards the surface 130, away from the surface 130, or across the surface 130. The ball striking device 110 can be operated using the object launch module 110 of the interaction engine 1501 or the ball striking device 110 can be operated manually. The camera 140 is operated to collect a sequence of images of the ball 120. The images are time-stamped. These images are provided to the computing device 150 and are then analyzed, e.g., using the interaction engine 1501, to determine a position of the ball 120 as it travels to the surface 130, contacts the surface 130, travels away from the surface 130, rolls across the surface 1530, or a combination thereof. The camera 140 may be triggered to acquire images in conjunction with the operation of the ball striking device 110.

Figure 16A:
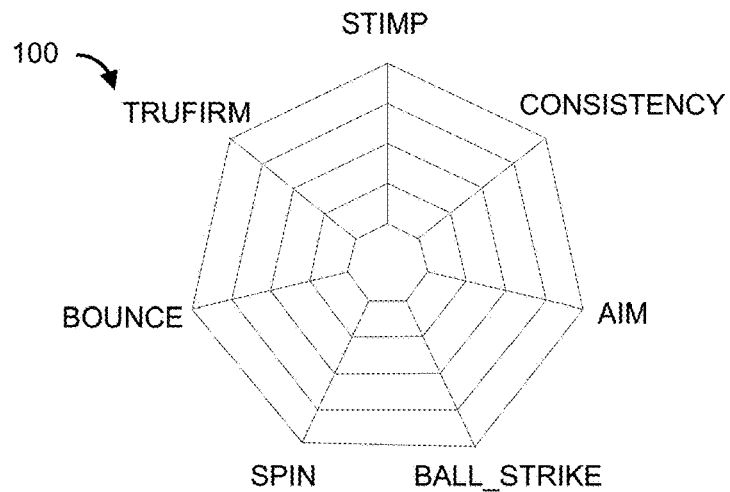
FIGS. 16A-16C are visualizations of a score for testing a surface.
Figure 16B:
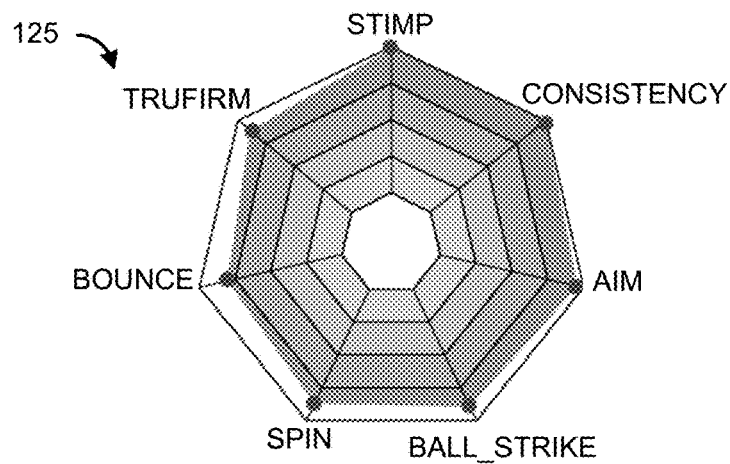
Figure 16C:
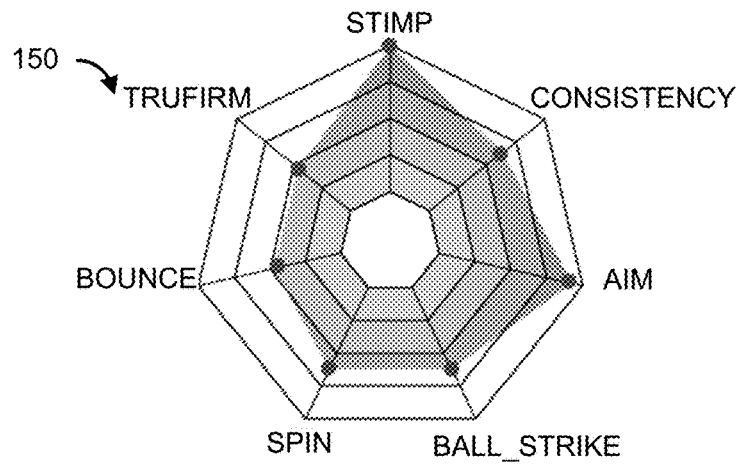

FIGS. 16A-16C are visualizations of a score for testing a surface. FIG. 16A is a graphical representation 1600 of a chart for mapping one or more parameters of a surface. For example, the graphical representation 1600 comprises a Putting Green Assessment Tool that can be utilized by the United States Golf Association (USGA). The one or more parameters can be determined based on the path of travel of the ball. For example, a speed of the ball, a distance traveled by the ball, any motion (e.g., bounce) by the ball, and so forth can be determined based on the path of travel of the ball.

The below chart indicates the expected values for a putting green, as well as the details of what each test measures. As will be appreciated by one skilled in the art, the below values are merely examples and the present disclosure should not be limited by the examples provided herein. Furthermore, the values may change based on further testing.

| Test | Expected Value | Details of the Test |
| --- | --- | --- |
| Stimp | 9.5-12 | Measures in ft. the distance rolled by a ball released from a USGA standardized ramp. |
| Trufirm | 300-450 | Measures the indentation (in thousandths of in.) of a hemisphere-shaped missile dropped from a standardized height. |
| Bounce | 6-9 | Measures in ft. the final distance of the ball launched with backspin from 2 ft. height. |
| Spin | 9-11 | Measures in ft. the final distance of the ball launched with backspin from ground level. |
| Ball strike | 3-5 | Measures the number of skips within 5 linear ft. immediately after club/ball contact for a 10 ft. putt. |
| Aim | 0-2 | Measures the relative variation within a 10 ft. putt replicated 5 times. |
| Consistency | 0.1-0.25 | Measures the overall variability within replicates and between tests as the coefficient of variation. |

FIG. 16B is a graphical representation 1625 of playability for an example surface. The values of the various tests represented by the graphical representation 1625 are listed in the chart below:

| Test | Expected Value | Actual |
| --- | --- | --- |
| Stimp | 9.5-12 | 10.23 |
| Trufirm | 300-450 | 298.6 |
| Bounce | 6-9 | 7.49 |
| Spin | 9-11 | 10.58 |
| Ball strike | 3-5 | 5 |
| Aim | 0-2 | 1.44 |
| Consistency | 0.1-0.25 | 0.22 |

FIG. 16C is a graphical representation 1650 of playability for an example field. The values of the various tests represented by the graphical representation 1625 are listed in the chart below:

| Test | Expected Value | Details of the Test |
| --- | --- | --- |
| Stimp | 9.5-12 | 10.65 |
| Trufirm | 300-450 | 531.2 |
| Bounce | 6-9 | 9.52 |
| Spin | 9-11 | 10.84 |
| Ball strike | 3-5 | 1.8 |
| Aim | 0-2 | 1.25 |
| Consistency | 0.1-0.25 | 0.31 |

Although the graphical representations in FIGS. 16A-16C are shown as two-dimensional visualizations, it is understood that the score for a given putting surface can be represented by any multidimensional representation.

Figure 17:
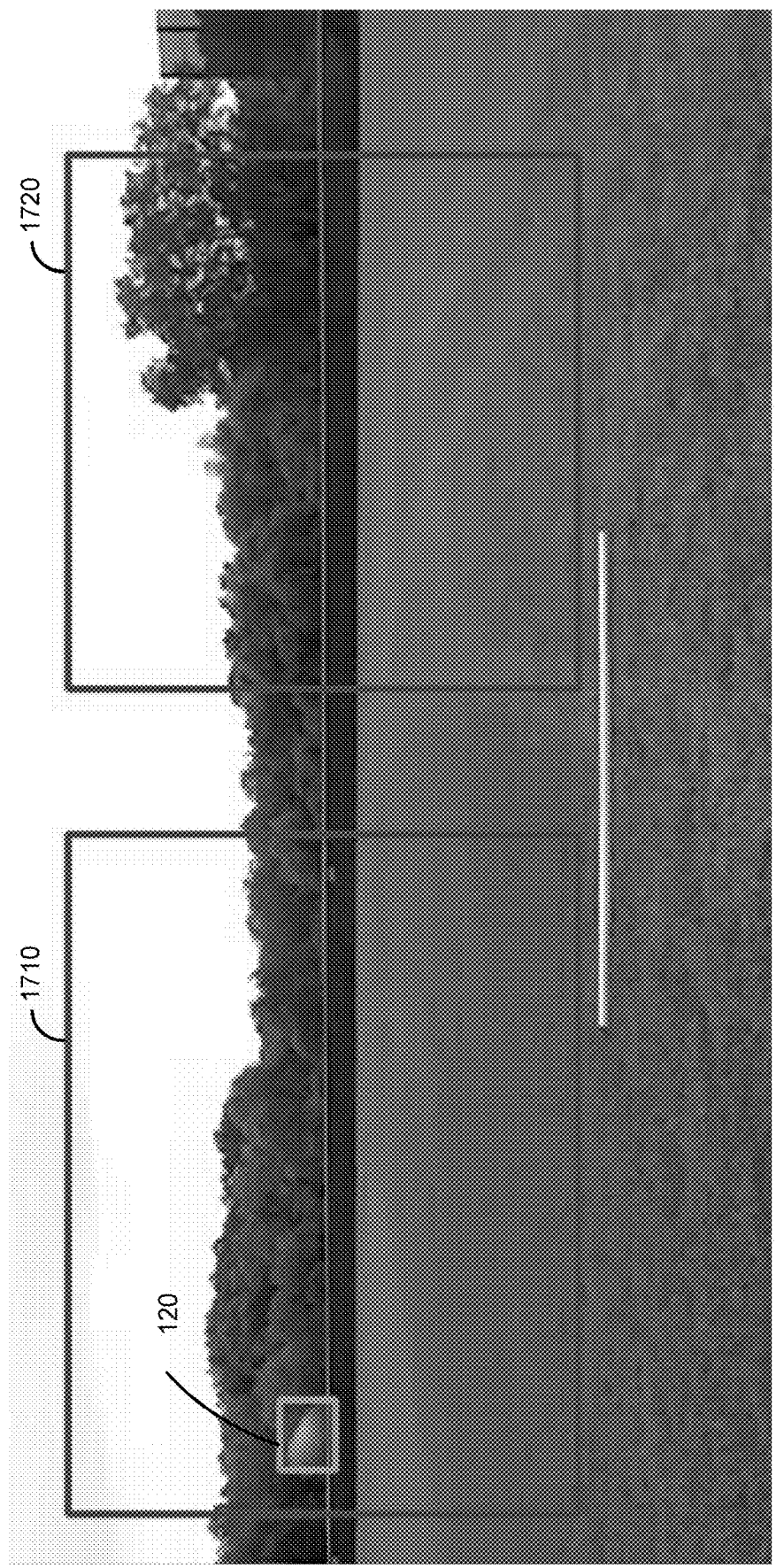
FIG. 17 is an example frame.

FIG. 17 shows an example frame including overlays indicating a pre-bounce area 1710, a post-bounce area 1720, and the ball 120. The resulting images may replace the original images in the video. One or more parameters may be specified to aid in object detection, for example, a maximum area and a minimum area indicating how large the ball 120 should appear in the video; a ceiling and a floor indicating a maximum and a minimum height that the ball 120 may appear in a frame; a left bound and a right bound indicating the area here the downward and upward trajectories of the ball 120 may be found, and a scale which can be used to convert coordinate differences into feet or meters. A scale can be placed in the frame for a given experiment and scaling data extracted therefrom. For example, an object of known length may be placed in the field of view of the camera 140. Any resulting images taken that include the object of known length may be analyzed to convert distances in the image (e.g., numbers of pixels) into physical distances (e.g., feet) according to the object of known length (e.g., extract scaling information). In another example, an indication of known length may be made on the ball 120. In another example, a grid may be placed in a background area behind the field of view of the camera 140. The grid may have lines separated by a known length. Any resulting images taken that include the grid may be analyzed to convert distances in the image (e.g., numbers of pixels) into physical distances (e.g., feet) according to the grid (e.g., extract scaling information).

Figure 18:
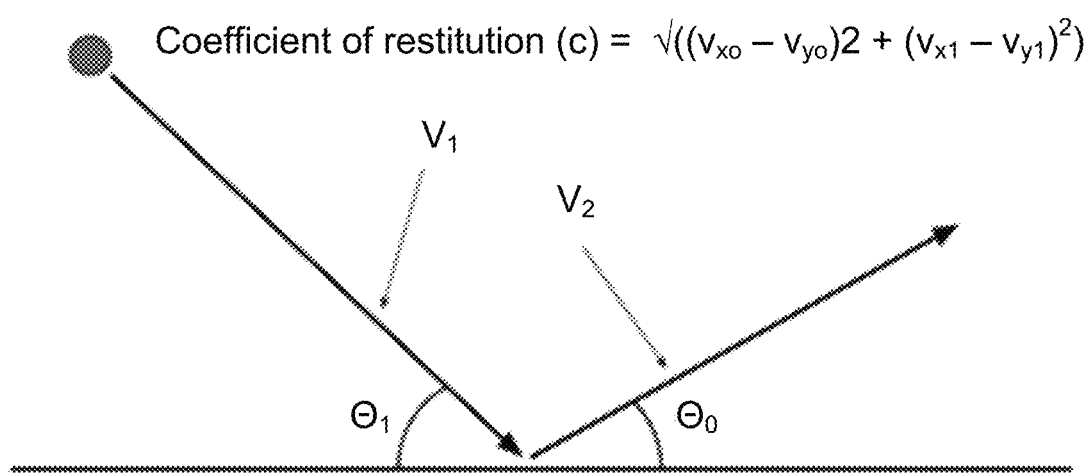
FIG. 18 is an example of the Coefficient of Restitution (COR)
Figure 19A:
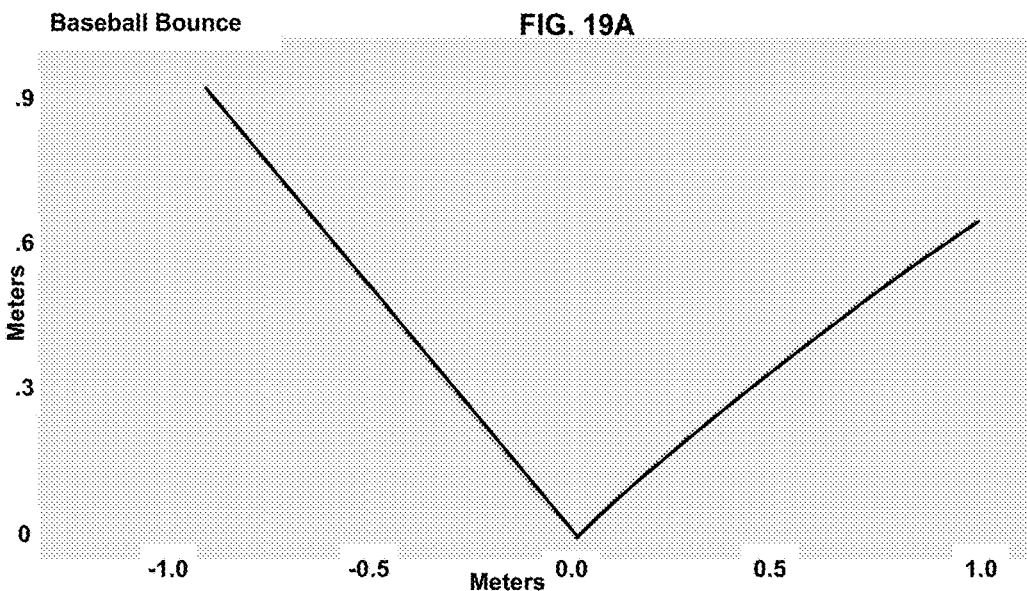
FIGS. 19A-19C are example plots of an object bounce.
Figure 19B:
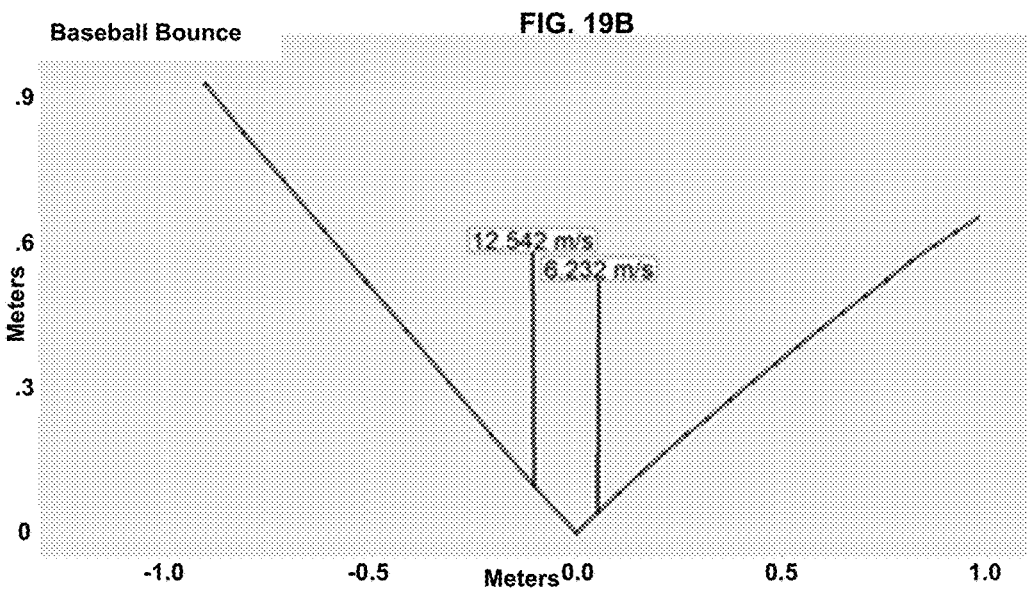
Figure 19C:
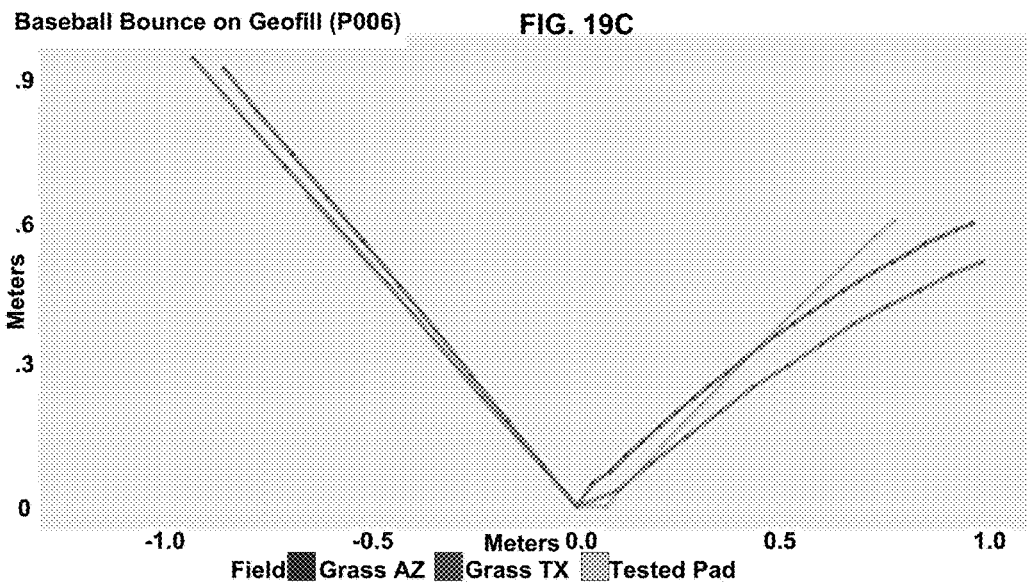

FIG. 18 shows an example of the principles of the Coefficient of Restitution, as discussed herein. FIG. 19 shows a plot of a ball bounce. FIG. 19A shows the plot of the ball bounce with $V_1$ and $V_2$ identified. $V_1$ is identified as 12.542 meters per second and $V_2$ is identified as 6.232 meters per second. The values of $V_1$ and $V_2$ may then be used to determine the COR. FIG. 19B shows a plurality of bounces of the same ball. The ball was bounced against a plurality of surfaces and the resulting bounces plotted. FIG. 19C visually shows the difference in ball bounces across the plurality of surfaces.

Figure 20:
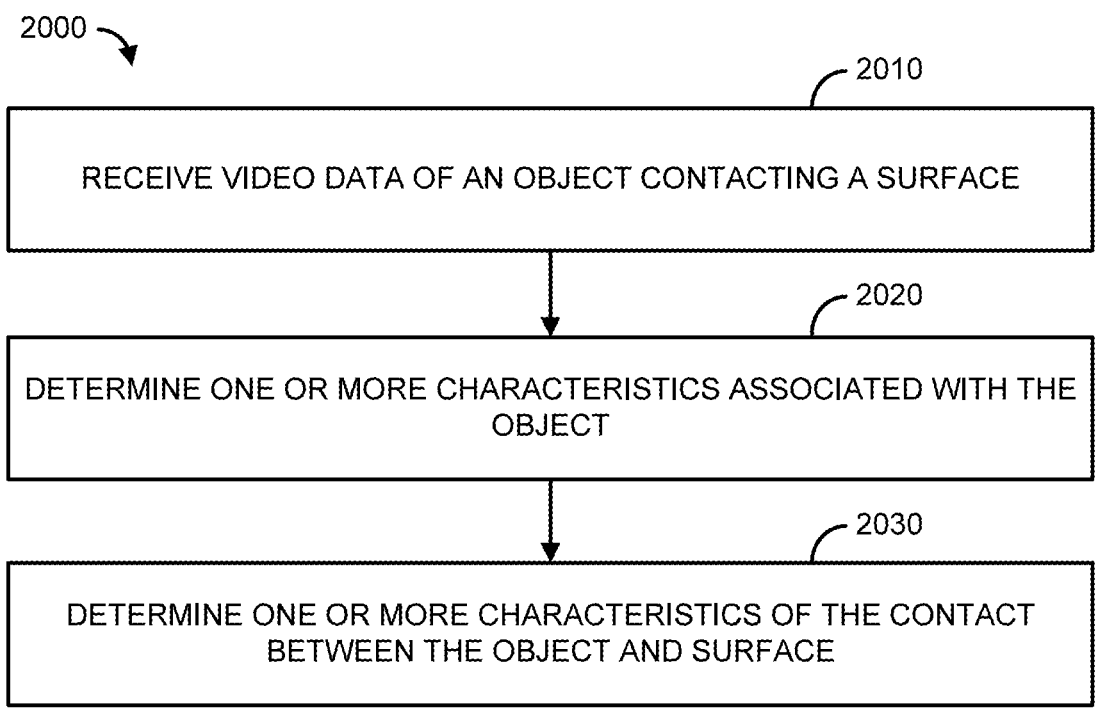
FIG. 20 is a flowchart of an example method for testing a surface.

FIG. 20 shows an example method 2000. The method 2000 may comprise, receiving video data at 2010. The video data may comprise video of an object contacting a surface. The video data may comprise a plurality of frames (e.g., images). The object can be one or more a golf ball, a baseball, a soccer ball, a football, a basketball, a lacrosse ball, a field hockey ball, a polo ball, a tennis ball, or the like. The surface can be a playing surface. The playing surface may be a golf course, a baseball field, a soccer field, a football field, a basketball court, a tennis court, polo grounds, a lacrosse field, or the like. The method 2000 may comprise determining, based on the video data, one or more characteristics associated with the object at 2020. The method 2000 may comprise determining, based on the one or more characteristics of the object, one or more characteristics of the contact between the object and surface at 2030. The method 2000 may further comprise striking, via a ball striking device, the ball recording, via a camera, the video of the ball contacting the surface, as well as the path of travel of the ball. A point of contact of the ball with the surface can be centered in a frame.

Determining, based on the video data, the one or more characteristics associated with the object may comprise extracting the plurality of frames from the video data, determining an initial frame of the plurality of frames as a baseline frame, comparing an additional frame of the plurality of frames to the baseline frame, and determining, based on the comparison, the one or more characteristics associated with the object. Comparing the additional frame of the plurality of frames to the baseline frame may comprise: a) determining a first position of the object in the baseline frame; b) determining a second position of the object in the additional frame; c) determining a difference in a height axis between the first position and the second position; and d) classifying, based on the difference in the height axis, the additional frame as a pre-bounce frame or as a post-bounce frame. The method 2000 can further comprise repeating b-d for a plurality of additional frames. Classifying, based on the difference in the height axis, the additional frame as a pre-bounce frame or as a post-bounce frame can comprise classifying the additional frame as a pre-bounce frame when the difference in the height axis is negative. Classifying, based on the difference in the height axis, the additional frame as a pre-bounce frame or as a post-bounce frame can comprise classifying the additional frame as a post-bounce frame when the difference in the height axis is positive.

The method 2000 can further comprise exporting a frame number associated with the additional frame, position coordinates of the object within the additional frame, and a timestamp associated with the additional frame. The method 2000 can further comprise generating, based on the additional frame and position coordinates of the object within the additional frame, an annotated video. The one or more characteristics associated with the contact between the object and the surface can comprise a bounce of the object, a pace of the object, or a spin of the object.

Determining, based on the video data, the bounce of the object can comprise determining, based on the position coordinates and the timestamp, a vertical coefficient of restitution (COR) associated with the object. Determining, based on the video data, the pace of the object can comprise determining, based on the position coordinates and the timestamp, a horizontal coefficient of restitution (COR) associated with the object. Determining, based on the video data, the spin of the object can comprise determining, based on an identifying mark on the object, a spin direction and a spin speed.

The method 2000 can further comprise setting at least one of, a maximum area for a position of the object within a frame, a minimum area for a position of the object within a frame, a maximum height for a position of the object within a frame, a minimum height for a position of the object within a frame, a left bound for a position of the object within a frame, or a right bound for a position of the object within a frame.

Figure 21:
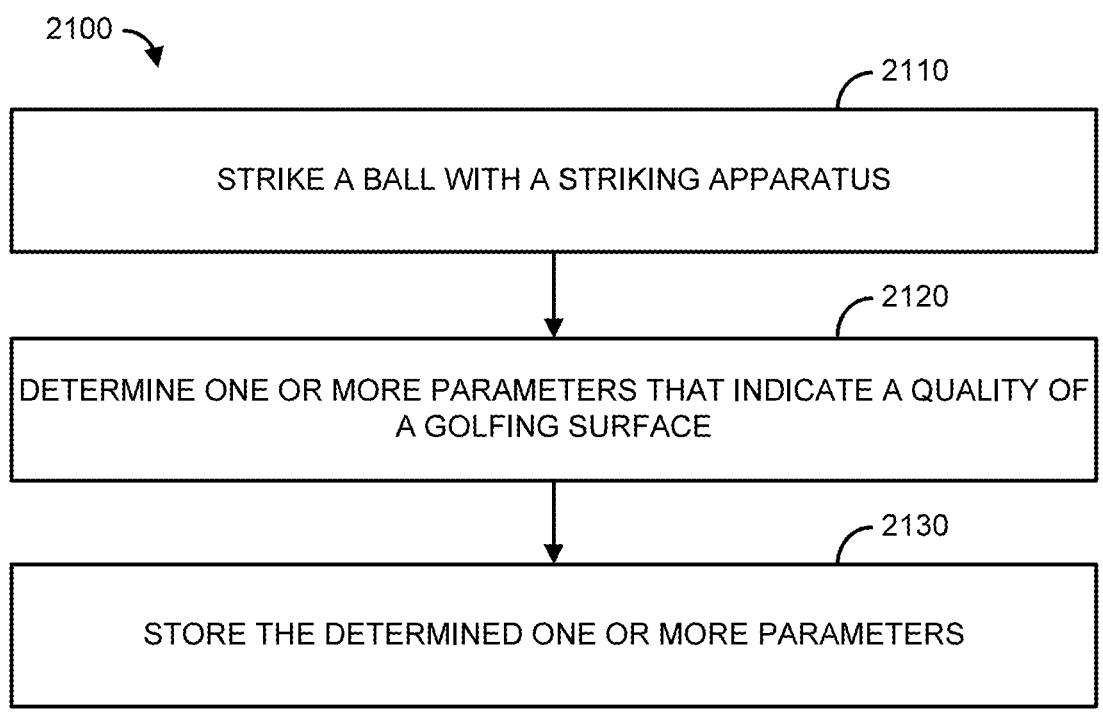
FIG. 21 is a flowchart of an example method for testing a surface.

FIG. 21 is a flowchart 2100 of an example method. At step 2110, a ball can be struck with a striking apparatus. The striking apparatus can be a ball striking apparatus as described herein. The ball striking apparatus can comprise a frame comprising a plurality of rail sections. A first rail section of the plurality of rail sections can comprise one or more cavities configured to receive a rod that extends through the first rail section. The apparatus can further comprise a rotatable member coupled to a second rail section of the plurality of rail sections and a third rail section of the plurality of rail sections. The rotatable member can be configured to couple a ball striking device to the frame such that the ball striking device is free to rotate around the rotatable member in a single direction. The rod that extends through the first rail section can configured to keep the ball striking device from moving around the rotatable member at a fixed height based on which of the one or more cavities the rod extends through. For example, when the rod is inserted through the first rail section, the rod keeps the ball striking device at a fixed position. When the rod is removed from the first rail section, the ball striking device is free to fall (e.g., due to gravity) from the position that the ball striking device was at prior to removal of the rod. Thus, the ball striking device will swing in a downward motion towards a ball and strike the ball when the rod is removed.

At step 2120, one or more parameters that indicate a quality of a surface are determined. For example, the one or more parameters can be based on a path of travel of the golf ball. The one or more parameters that indicate the quality of the surface may be determined by a computing device. The one or more may parameters indicate at least one of a stimp of the surface, a bounce of the surface, a consistency of the surface, an aim of the surface, a ball striking ability of the surface, a spin of the surface, or a firmness of the surface. The computing device can be coupled with a recording element configured to capture at least one of still images or video of the ball when the ball is either launched by the ball launching member or struck by the ball striking device. The recording element can capture the travel path of the ball.

At step 2130, the one or more parameters can be stored. For example, the one or more parameters can be stored in memory. As an example, the one or more parameters can be stored in the memory 2304 and/or 2312 of the computing device 2301 of FIG. 23. Additionally, the one or more parameters can be utilized to generate a visual representation of the quality of the surface.

Figure 22:
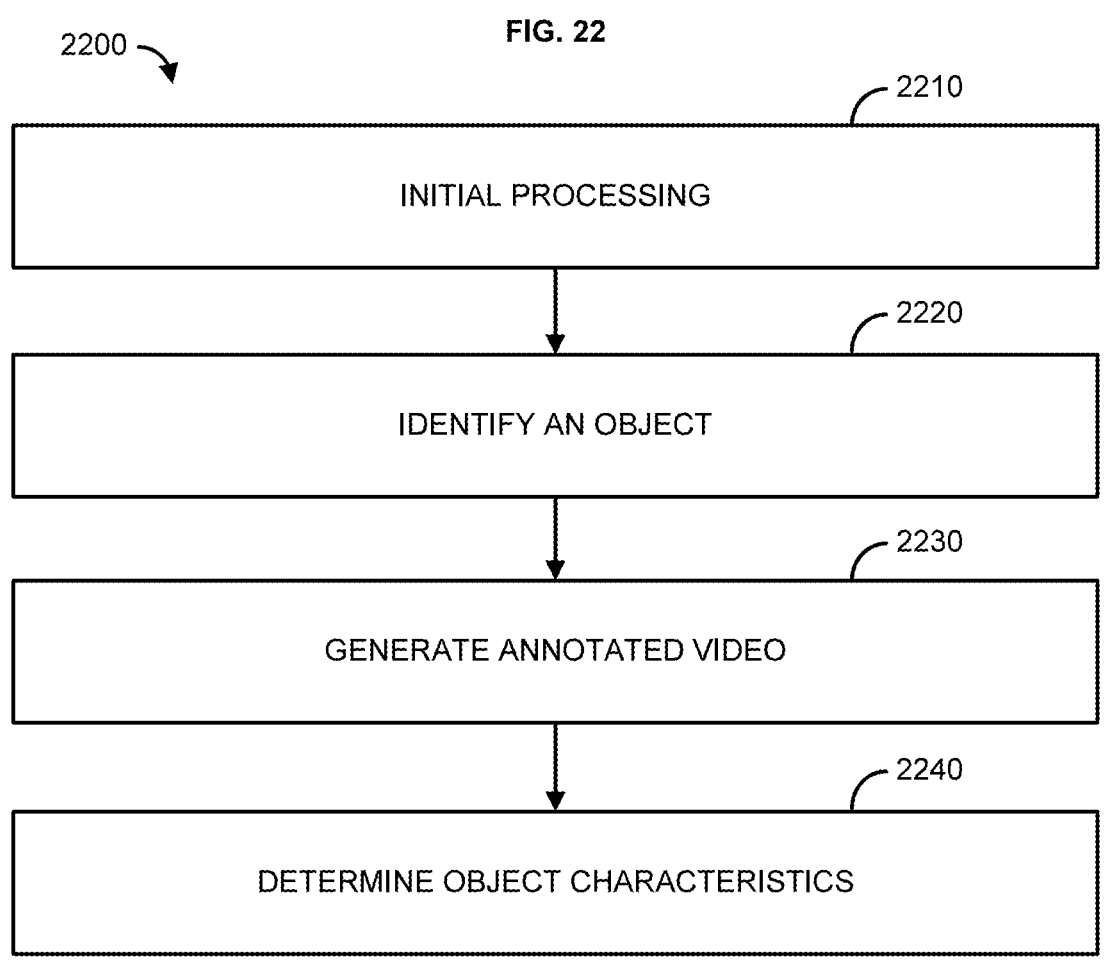
FIG. 22 is a flowchart of an example method for testing a surface.

The flow chart of FIG. 22 illustrates an example process 2200 of analyzing a plurality of images (e.g., a video) in which the ball 120 has been captured in flight. The process begins in step 2210, where the image analysis module 1520 of the interaction engine 1501 may perform initial processing of the plurality of images. Initial processing may include extracting the plurality of images as frames from a video. Initial processing may include the determination of one or more baseline images from the plurality of images. That is, an image of the field of view of the camera 140 immediately before the ball 120 is struck by the ball striking device 110. The baseline image may be subtracted from subsequent images containing the ball 120 as the ball 120 travels along its travel path. In this manner, background imagery is suppressed, bringing the imagery of interest (that of the ball 120 traveling) to the foreground.

After the initial processing of step 2210, the process 2200 proceeds to step 2220, where areas within an image that are likely to be the ball 120 are located. This step differentiates, at least to a first order, objects that are likely to be the ball 120, from other objects, such as a birds, trees, or a golf club. To locate candidate objects, the image analysis module 1520 may employ a process called "blob finding," or blob detection. In an example embodiment, blob detection may be performed using the SimpleBlobDetector class in the OpenCV computer vision library. SimpleBlobDetector uses an implementation of the Suzuki contour finding algorithm to find contours and then groups the closed contours into "blobs." Such contour finding is described, for example, in: Suzuki, S. and Abe, K., *Topological Structural Analysis of Digitized Binary Images by Border Following*. CVGIP 30 1, pp 32-46 (1985). The image analysis module 1520 may locate smooth edges of the candidate object and assign a score indicative of the candidate object's quality. A candidate object having a score above a threshold may be determined as an identified ball 120. In an embodiment, at least two successive images prior to the ball 120 contacting the surface 130 (pre-bounce) and at least two successive images after the ball 120 contacts the surface 130 (post-bounce) may be analyzed to identify the ball 120 in each image. An image identifier for each image (e.g., a frame number) and the position of the object in each image may be exported. In an embodiment, timestamps associated with each image may also be exported. In an embodiment, several successive images are taken as the ball 120 travels across the surface 130.

Optionally, at step 2230, the image analysis module 1520 may generate, or cause the generation of, an annotated video. The image analysis module 1520 may overlay a shape, such as a square, over the area of each image that includes the ball 120. The image analysis module 1520 may overlay a shape, such as a square, over a pre-bounce area of each image (e.g., the area that the ball 120 passed through while falling toward the surface) and a post-bounce area (e.g., the area that the ball 120 passed through while bouncing away from the surface).

At step 2240, the interaction assessment module 1530 of the interaction engine 1501 may determine one or more characteristics of the ball 120. The interaction assessment module 1530 may determine one or more of ball bounce, ball pace, ball spin, ball travel, surface firmness, any parameters associated with the surface, and the like.

The interaction assessment module 1530 may determine ball bounce using the physics principle for Coefficient of Restitution (COR) (FIG. 18). COR is the ratio of the vertical speed of the ball 120 after a bounce, $V_2$, (post-bounce or rebound speed) and before the bounce, $V_2$, (pre-bounce or incident speed). The vertical and horizontal COR may also depend on elastic properties of the surface 130. For example, if the surface is rubber rather than concrete then the horizontal COR will be larger and the ball will spin faster after the ball bounces. The COR for a vertical bounce off a surface may be defined as the ratio of the rebound speed to the incident speed. The COR for a horizontal bounce can be defined for an oblique impact in terms of the horizontal components of the incident and rebound speeds of the contact point on the ball. Specifically, a vertical value ($e_y$) and a horizontal value ($e_x$) can be defined as:

$$e_y = \frac{v_{y2}}{v_{y1}},$$

where the subscripts 1 and 2 denote conditions before and after the collision, respectively, and where $e_y$ is between 0 and 1 ($v_{y1}$ being negative). Similarly, $e_x$ can be defined by the relation $$e_x = \frac{v_{x2\_}R_{\omega 2}}{v_{x1\_}R_{\omega 1}}$$

where $v_x - R_\omega$ is the net horizontal speed of a point at the bottom of the ball. Other techniques for determining COR are specifically contemplated.

Analysis of the video and/or images may generate x and y coordinates at given time stamps. These x and y coordinates may be manipulated so as to make the minimum value of the values y 0 (y0) and all other y values may be manipulated to maintain the same distance and orientation to y0. The x value of y0 to 0 as well (x0) and maintain all x value's orientation and distance to x0. This allows a bounce to be overlapped with other bounces to compare similarity.

The interaction assessment module 1530 may determine ball pace using COR. Pace is measured as the COR for horizontal speeds. The video analysis yields horizontal speeds using a reference point, spatial position of the ball frame by frame, and the recording settings (frames per second). Pace varies between 0 to 1. Zero would represent complete deadening and stop of the ball or object, and 1 would represent identical speeds before and after the bounce.

The interaction assessment module 1530 may determine ball spin which may be measured based on how much grip the surface 1530 offers to the ball 120. More grip results in a greater rotation of the ball 120, less grip results in more "skipping" of the ball 120. Once the ball 120 is tracked by the video system, it should be possible to identify spin direction and speed using identifying marks on the ball. This is only possible in high frame rate video with low motion blur. Additionally, the interaction assessment module 1530 can determine any of the parameters of the ball or the surface as discussed herein.

Figure 23:
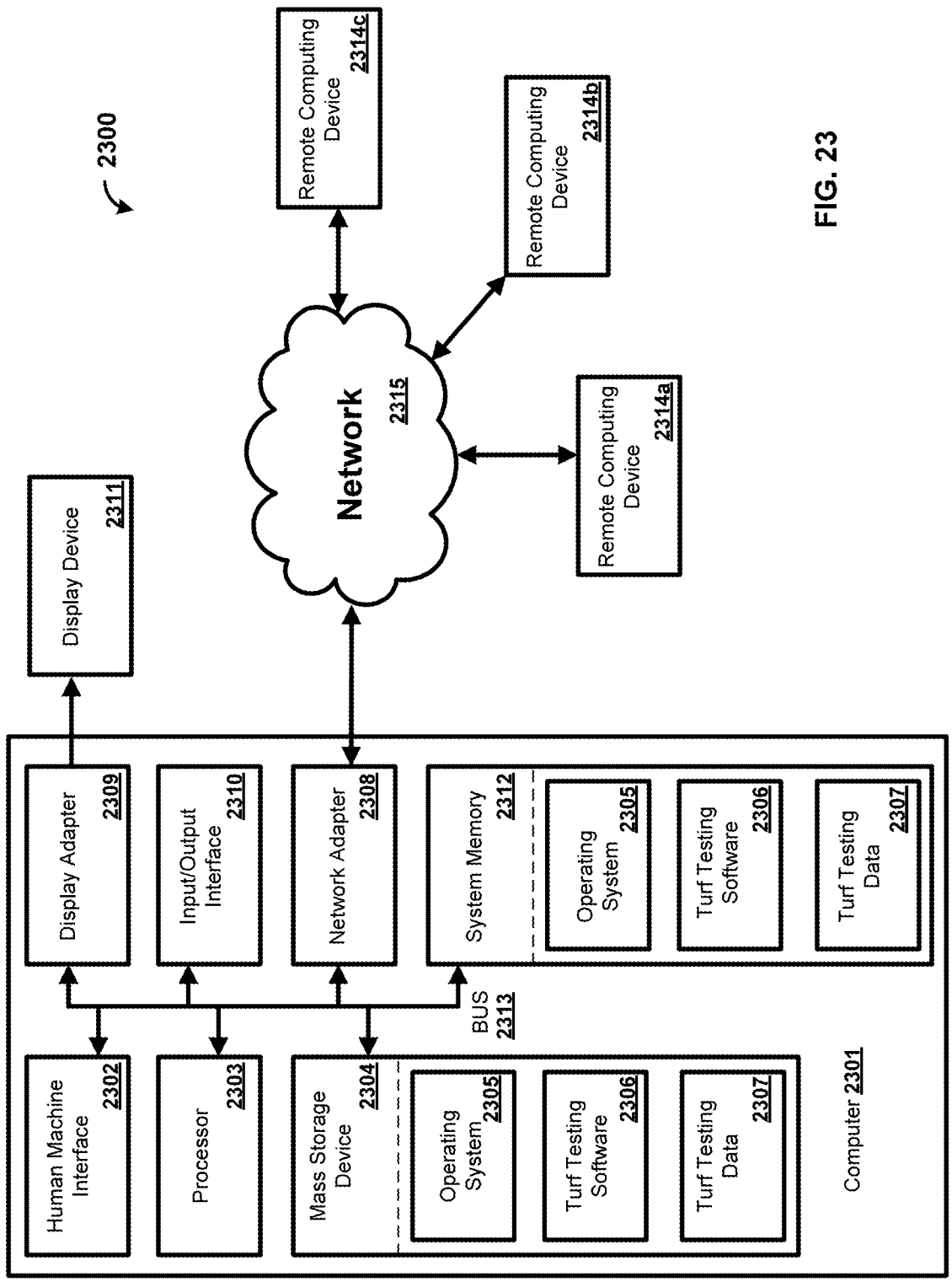
FIG. 23 is a block diagram of an example computing device.

FIG. 23 is a block diagram of an example computing device. In an exemplary aspect, the methods and systems can be implemented on a computer 2301 as illustrated in FIG. 23 and described below. Similarly, the methods and systems disclosed can utilize one or more computers to perform one or more functions in one or more locations. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 2301. The components of the computer 2301 can comprise, but are not limited to, one or more processors 2303, a system memory 2312, and a system bus 2313 that couples various system components including the one or more processors 2303 to the system memory 2312. The system can utilize parallel computing.

The system bus 2313 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 2313, and all buses specified in this description can also be implemented over a wired or wireless network connection and each of the subsystems, including the one or more processors 2303, a mass storage device 2304, an operating system 2305, turf testing software 2306, turf testing data 2307, a network adapter 2308, the system memory 2312, an Input/Output Interface 2310, a display adapter 2309, a display device 2311, and a human machine interface 2302, can be contained within one or more remote computing devices 2314a,b,c at physically separate locations, connected through buses of this form, in effect implementing a fully distributed system. One of the one or more remote computing devices 2314a,b,c may not be at a physically separate location. For example, the remote computing device 2314a may be a recording element coupled to the computing device 2301 via the Input/Output Interface 2310. The recording element can be at a same location as the computing device 2301. The recording element can be a camera, a video camera, a microphone or any device capable of capturing audio or video. The recording element can be configured to capture data related to a path of travel of a ball. The computing device 2301 may determine one or more parameters based on the path of travel of the ball.

The computer 2301 typically comprises a variety of computer readable media. Exemplary readable media can be any available media that is accessible by the computer 2301 and comprises, for example and not meant to be limiting, both volatile and non-volatile media, removable and non-removable media. The system memory 2312 comprises computer readable media in the form of volatile memory, such as random access memory (RAM), and/or non-volatile memory, such as read only memory (ROM). The system memory 2312 typically contains data such as the turf testing data 2307 and/or program modules such as the operating system 2305 and the turf testing software 2306 that are immediately accessible to and/or are presently operated on by the one or more processors 2303.

In another aspect, the computer 2301 can also comprise other removable/non-removable, volatile/non-volatile computer storage media. By way of example, FIG. 23 illustrates the mass storage device 2304 which can provide non-volatile storage of computer code, computer readable instructions, data structures, program modules, and other data for the computer 2301. For example and not meant to be limiting, the mass storage device 2304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 2304, including by way of example, the operating system 2305 and the turf testing software 2306. Each of the operating system 2305 and the turf testing software 2306 (or some combination thereof) can comprise elements of the programming and the turf testing software 2306. The turf testing data 2307 can also be stored on the mass storage device 2304. The turf testing data 2307 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

In another aspect, the user can enter commands and information into the computer 2301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 2303 via the human machine interface 2302 that is coupled to the system bus 2313, but can be connected by other interface and bus structures, such as a parallel port, game port, an IEEE 1394 Port (also known as a Firewire port), a serial port, or a universal serial bus (USB).

In yet another aspect, the display device 2311 can also be connected to the system bus 2313 via an interface, such as the display adapter 2309. It is contemplated that the computer 2301 can have more than one display adapter 2309 and the computer 2301 can have more than one display device 2311. For example, the display device 2311 can be a monitor, an LCD (Liquid Crystal Display), or a projector. In addition to the display device 2311, other output peripheral devices can comprise components such as speakers (not shown) and a printer (not shown) which can be connected to the computer 2301 via the Input/Output Interface 2310. Any step and/or result of the methods can be output in any form to an output device. Such output can be any form of visual representation, including, but not limited to, textual, graphical, animation, audio, tactile, and the like. The display device 2311 and computer 2301 can be part of one device, or separate devices.

The computer 2301 can operate in a networked environment using logical connections to one or more remote computing devices 2314a,b,c. By way of example, a remote computing device can be a personal computer, portable computer, smartphone, a server, a router, a network computer, a peer device or other common network node, and so on. Logical connections between the computer 2301 and a remote computing device 2314a,b,c can be made via a network 2315, such as a local area network (LAN) and/or a general wide area network (WAN). Such network connections can be through the network adapter 2308. The network adapter 2308 can be implemented in both wired and wireless environments. Such networking environments are conventional and commonplace in dwellings, offices, enterprise-wide computer networks, intranets, and the Internet.

For purposes of illustration, application programs and other executable program components such as the operating system 2305 are illustrated herein as discrete blocks, although it is recognized that such programs and components reside at various times in different storage components of the computing device 2301, and are executed by the one or more processors 2303 of the computer. An implementation of the turf testing software 2306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claim.

What is claimed is:

1. An apparatus, comprising:
a frame comprising a plurality of rail sections;
a rotatable member coupled to a first portion of the frame comprising a first rail section of the plurality of rail sections and a second rail section of the plurality of rail sections, wherein the rotatable member is configured to couple a ball striking device to the first portion of the frame; and
a ball launching member coupled to a second portion of the frame comprising a third rail section of the plurality of rail sections.

2. The apparatus of claim 1, wherein the ball launching member comprises a first end and a second end, wherein the first end comprises a first angled end configured to launch a ball at a first predetermined launch angle and wherein the second end comprises a second angled end configured to launch the ball at a second predetermined launch angle different from the first predetermined launch angle.

3. The apparatus of claim 1, wherein the plurality of rail sections further comprise a fourth rail section comprising a plurality of holes extending through the fourth rail section and configured to receive a rod, wherein the rod extends through a hole of the plurality of holes and into a swing path of the ball striking device to stop rotation of the ball striking device at a vertical height of the hole of the plurality of holes.

4. The apparatus of claim 1, wherein the ball launching member is configured to move one of horizontally or vertically along the third rail section.

5. The apparatus of claim 1, wherein a computing device is coupled with a recording element configured to capture at least one of still images or video of a ball when the ball is impacted by either the ball launching member or the ball striking device.

6. The apparatus of claim 1, wherein the ball launching member comprises a first angled end configured to contact a ball, wherein the first angled end comprises a material coating over the first angled end, and wherein the material coating is configured to increase a coefficient of friction between the ball launching member and the ball.

7. The apparatus of claim 1, wherein the ball striking device comprises at least one of a mallet, a golf club, a putter, a baton, a staff, or a ball striking rod.

8. A method, comprising:
striking a ball with a ball striking apparatus, wherein the ball striking apparatus comprises:
a frame comprising a plurality of rail sections;
a rotatable member coupled to a first portion of the frame comprising a first rail section of the plurality of rail sections and a second rail section of the plurality of rail sections, wherein the rotatable member is configured to couple a ball striking device to the first portion of the frame; and
a ball launching member coupled to a second portion of the frame comprising a third rail section of the plurality of rail sections;
determining, based on a travel path of the ball, one or more parameters that indicate a quality of a surface; and
storing one or more of the indicated quality of the surface or the determined one or more parameters.

9. The method of claim 8, wherein the one or more parameters indicate at least one of a stimp of the surface, a bounce of the surface, a consistency of the surface, an aim of the surface, a ball striking ability of the surface, a spin of the surface, or a firmness of the surface.

10. The method of claim 8, wherein striking the ball comprises one of the ball striking device rotating about a first axis to strike the ball or the ball launching member moving linearly along a second axis to strike the ball.

11. The method of claim 8, wherein the ball launching member is configured to move one of horizontally or vertically along the third rail section.

12. The method of claim 8, wherein the plurality of rail sections further comprise a fourth rail section comprising a plurality of holes extending through the fourth rail section and configured to receive a rod, wherein the rod extends through a hole of the plurality of holes and into a swing path of the ball striking device to stop rotation of the ball striking device at a vertical height of the hole of the plurality of holes.

13. The method of claim 8, further comprising, determining, based on at least one of the one or more parameters, a coefficient of restitution of the surface.

14. The method of claim 8, further comprising generating a visual representation of the quality of the surface.

15. An apparatus, comprising:
a frame comprising a plurality of rail sections; and
a ball launching member coupled to and configured to move along a first rail section of the plurality of rail sections, wherein the ball launching member comprises a first end comprising a first angled end and a second end comprising a second angled end, wherein the first angled end is configured to launch a ball at a first launch angle and wherein the second angled end is configured to launch the ball at a second launch angle different from the first launch angle.

16. The apparatus of claim 15, wherein the ball launching member is configured to one of move vertically along the first rail section to impact the ball in order to cause the ball to move or move horizontally along the first rail section to impact the ball in order to cause the ball to move.

17. The apparatus of claim 15, further comprising a platform disposed along the frame, wherein the ball is configured to rest upon a portion of the platform prior to the ball launching member impacting the ball.

18. The apparatus of claim 15, wherein the ball launching member further comprises a material coating over at least one of the first angled end and the second angled end, wherein the material coating is configured to increase a coefficient of friction between the ball launching member and the ball.

19. The apparatus of claim 15, further comprising a motor operably coupled to the ball launching member and configured to move the ball launching member along the first rail section.

20. The apparatus of claim 15, wherein the first launch angle is based on a first golf club and the second launch angle is based on a second golf club.

* * * * *